United States Patent
Glass et al.

(10) Patent No.: US 10,356,365 B2
(45) Date of Patent: *Jul. 16, 2019

(54) FRAMEWORK TO SUPPORT A HYBRID OF MESHED ENDPOINTS WITH NON-MESHED ENDPOINTS

(71) Applicant: CafeX Communications Inc., Boston, MA (US)

(72) Inventors: Kevin Glass, Cardiff (GB); Kris Hopkins, Boston, MA (US); John Holvey, Cardiff (GB); Sean O'Loughlin, Cardiff (GB)

(73) Assignee: CafeX Communications Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,497

(22) Filed: Mar. 20, 2017

(65) Prior Publication Data
US 2017/0195632 A1 Jul. 6, 2017

Related U.S. Application Data

(63) Continuation of application No. 15/280,625, filed on Sep. 29, 2016, now Pat. No. 9,602,772, which is a
(Continued)

(51) Int. Cl.
*H04N 7/14* (2006.01)
*H04N 7/15* (2006.01)
*H04N 5/265* (2006.01)

(52) U.S. Cl.
CPC ............ *H04N 7/152* (2013.01); *H04N 5/265* (2013.01); *H04N 7/147* (2013.01)

(58) Field of Classification Search
CPC combination set(s) only.
See application file for complete search history.

(56) References Cited

U.S. PATENT DOCUMENTS 8,606,963 B2 * 12/2013 Bachmann ............ H04W 8/04
370/328
8,625,589 B2 * 1/2014 Chen .................... H04L 12/185
348/14.12
(Continued)

FOREIGN PATENT DOCUMENTS

EP 2 693 747 A2 2/2014
EP 3127001 A2 2/2017
(Continued)

OTHER PUBLICATIONS

International Search Report issued in connection with PCT/US15/24286.
(Continued)

*Primary Examiner* — Phung-Hoang J Nguyen
(74) *Attorney, Agent, or Firm* — Akerman LLP

(57) ABSTRACT

A videoconferencing system includes a hybrid MCU configured to act as a hybrid mesh participant in a videoconference. The hybrid MCU may include a processing module to mix videoconference media data received by the hybrid MCU in data streams transmitted from mesh and non-mesh endpoints. The hybrid MCU may further include a forking module to fork combined video/audio data streams received by the hybrid MCU to provide separate video and audio data streams to each mesh endpoint. The hybrid MCU may be configured to provide a mixed video/audio data steam to each non-mesh endpoint of the videoconference.

18 Claims, 6 Drawing Sheets

Related U.S. Application Data continuation of application No. 14/677,628, filed on Apr. 2, 2015, now abandoned.

(60) Provisional application No. 61/974,849, filed on Apr. 3, 2014.

(56) References Cited

U.S. PATENT DOCUMENTS

| | | | | |
|---|---|---|---|---|
| 8,667,496 | B2* | 3/2014 | Levin | G06F 9/5077 709/223 |
| 9,602,772 | B2 | 3/2017 | Glass et al. | |
| 2002/0022551 | A1 | 2/2002 | Watterson et al. | |
| 2008/0002818 | A1 | 1/2008 | Kashimoto | |
| 2008/0137559 | A1 | 6/2008 | Sasaki et al. | |
| 2011/0187813 | A1 | 8/2011 | Musgrave | |
| 2012/0081506 | A1* | 4/2012 | Marvit | H04N 7/15 348/14.12 |
| 2012/0320146 | A1 | 12/2012 | Civanlar et al. | |
| 2013/0194378 | A1 | 8/2013 | Brown | |
| 2013/0222523 | A1* | 8/2013 | Shanmukhadas | H04N 19/40 348/14.08 |
| 2014/0028788 | A1 | 1/2014 | Halavy | |
| 2014/0071223 | A1* | 3/2014 | Chatterjee | H04L 65/403 348/14.08 |
| 2015/0271447 | A1* | 9/2015 | Glass | H04N 7/147 348/14.09 |
| 2015/0288926 | A1 | 10/2015 | Glass et al. | |
| 2015/0326825 | A1 | 11/2015 | Bebbington et al. | |
| 2017/0195632 | A1 | 7/2017 | Glass et al. | |

FOREIGN PATENT DOCUMENTS

| | | |
|---|---|---|
| WO | 2015/143051 A1 | 9/2015 |
| WO | 2015/153994 A3 | 10/2015 |

OTHER PUBLICATIONS

Written Opinion of the International Searching Authority issued in connection with PCT/US15/24286.
Office Action cited in corresponding Japanese Application No. 2017-503793, dated Sep. 11, 2017, along with English translation.
Office Action issued in corresponding Canadian Patent Application No. 2,944,733 dated Feb. 26, 2018.
Supplementary European Search Report issued in corresponding European Patent Application No. 15 77 4041 dated Oct. 10, 2017.
Thom G.A., "H. 323: The Multimedia Communications Standard for Local Area Networks", IEEE Communications Magazine, IEEE Services Center, Piscataway, U.S., vol. 34, No. 12, Dec. 1, 1996.
International Search Report issued in connection with PCT/US2015/021280.
Written Opinion of the International Searching Authority issued in connection with PCT/US2015/021280.
Office Action issued in corresponding Canadian Patent Application No. 2,944,733 dated Oct. 22, 2018.

* cited by examiner

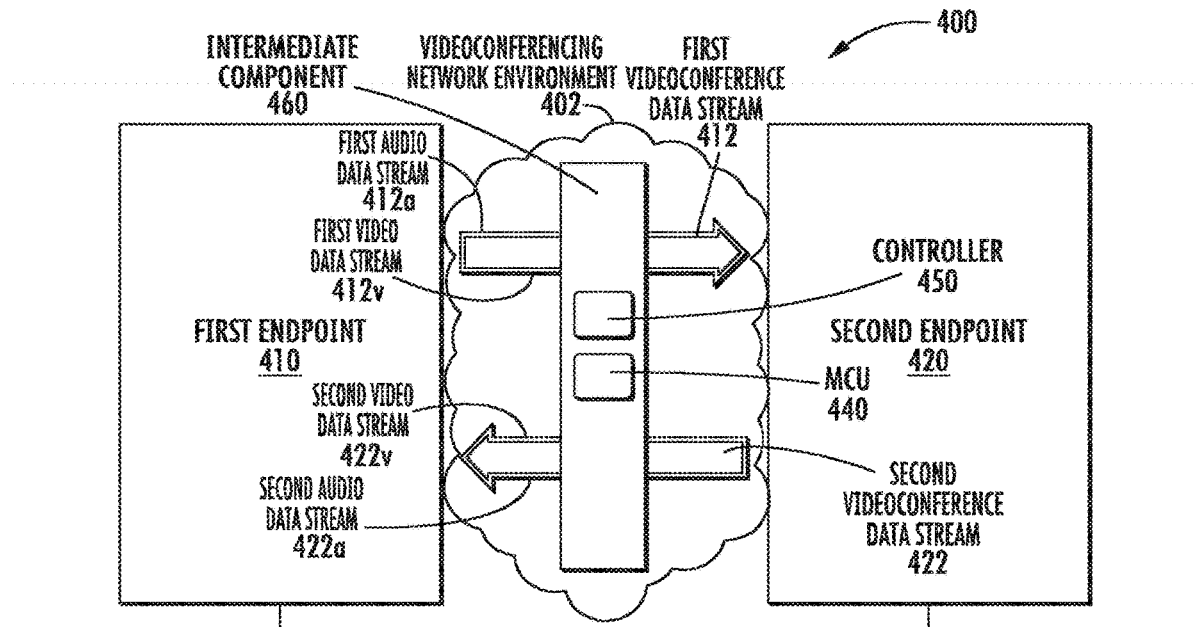
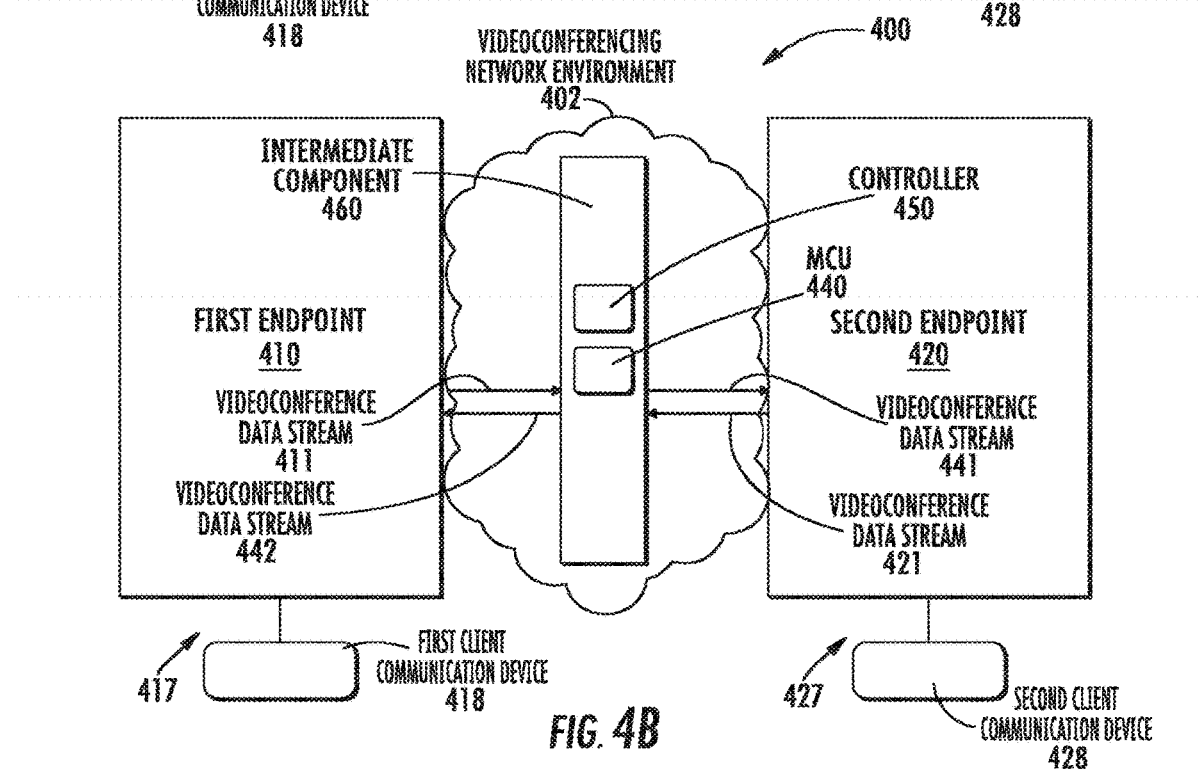

FRAMEWORK TO SUPPORT A HYBRID OF MESHED ENDPOINTS WITH NON-MESHED ENDPOINTS

CROSS-REFERENCE TO RELATED APPLICATIONS

This application is a continuation application and claims the benefit of the filing date under 35 U.S.C. § 120 of U.S. patent application Ser. No. 15/280,625, filed on Sep. 29, 2016, which is a continuation application and claims the benefit of the filing date under 35 U.S.C. § 120 of U.S. patent application Ser. No. 14/677,628, filed on Apr. 2, 2015, now abandoned, which claims priority under 35 U.S.C. § 119(e) to U.S. Provisional Patent Application No. 61/974,849, filed on Apr. 3, 2014. U.S. patent application Ser. Nos. 15/280,625, 14/677,628, and 61/974,849 are hereby incorporated by reference into this specification in their entirety.

TECHNICAL FIELD

The present application is directed to videoconferencing. More specifically, the present application is directed to a hybrid framework to support meshed and non-meshed endpoints in a mesh videoconference.

BACKGROUND

Videoconference services provide two-way media data conferencing between multiple conference participants that may be associated with different networks, endpoints, or remote locations. Video processing is intensive and requires expensive dedicated hardware or significant quantity of commodity servers to scale to large numbers of conferences or participants. One videoconferencing technique is mesh-based videoconferencing wherein endpoints exchange streams of media data transmissions. Mesh-based videoconferencing requires significant network capabilities at participant endpoints, especially as the number of participants increases. Another videoconferencing technique uses a multi-connection unit (MCU) that reduces local strain on participant endpoints compared to mesh-based videoconferencing by handling the bulk of the data processing, transmission, and reception. MCU-based videoconferencing, however, merely reallocates the resource strain to the MCU service. The MCU is a central resource that limits the number of conferences or participants that can be held or joined concurrently to the capacity of the deployed MCU. As the number of participants and MCU videoconferences increase, the strain may affect the quality of the videoconference environment provided by the MCU service.

SUMMARY

In one aspect, a videoconferencing device is configured to act as a hybrid mesh participant in a videoconference environment and includes a hybrid MCU. The hybrid MCU may be configured to receive and transmit the videoconference data streams comprising video media data and audio media data. The hybrid MCU may comprise a processing module configured to mix at least a portion of the video media data and the audio media data received by the hybrid MCU. The hybrid MCU may be configured to transmit the mixed video media data and the mixed audio media data to each non-mesh endpoint in a mixed video/audio data stream. A forking module may be configured to fork combined video/audio data streams received by the hybrid MCU into separate video and audio data streams. The hybrid MCU may be configured to transmit the separate video and audio data streams to each mesh endpoint.

In another aspect, a hybrid videoconferencing method comprises combining meshed and non-meshed devices in a single videoconference to optimize network resources and remove the need for central MCU resources when the resources are not required.

In yet another aspect, a method of combining meshed and non-meshed devices in a single videoconference comprises receiving data streams comprising video media data and audio media data from videoconference participants comprising mesh endpoints and non-mesh endpoints. The method may further include mixing the video media data and the audio media data with a hybrid MCU, providing a mixed video/audio data stream to each non-mesh endpoint, and providing separate video and audio data streams from each non-mesh endpoint to each mesh endpoint. The method may further comprise providing separate video and audio data streams from each non-mesh endpoint to each mesh endpoint comprising forking combined video/audio data streams to provide the separate video and audio data streams to each mesh endpoint.

In still another aspect, a videoconferencing system comprises a hybrid MCU configured to act as a hybrid mesh participant in a videoconference. The hybrid MCU comprises a processing module to mix videoconference media data comprising video data and audio data received in data streams from mesh and non-mesh endpoints of the videoconference and a forking module to fork combined video/audio data streams into separate video and audio data streams that are transmitted to each mesh endpoint. The hybrid MCU may be configured to provide a mixed video/audio data steam to each non-mesh endpoint of the videoconference.

FIGURES

The novel features of the described embodiments are set forth with particularity in the appended claims. The described embodiments, however, both as to organization and manner of operation, may be best understood by reference to the following description, taken in conjunction with the accompanying drawings in which:

FIGS. 4A & 4B are schematic representations of a videoconference system for switching from mesh-based to MCU-based conferencing according to various embodiments described herein;

DETAILED DESCRIPTION

Figure 1:
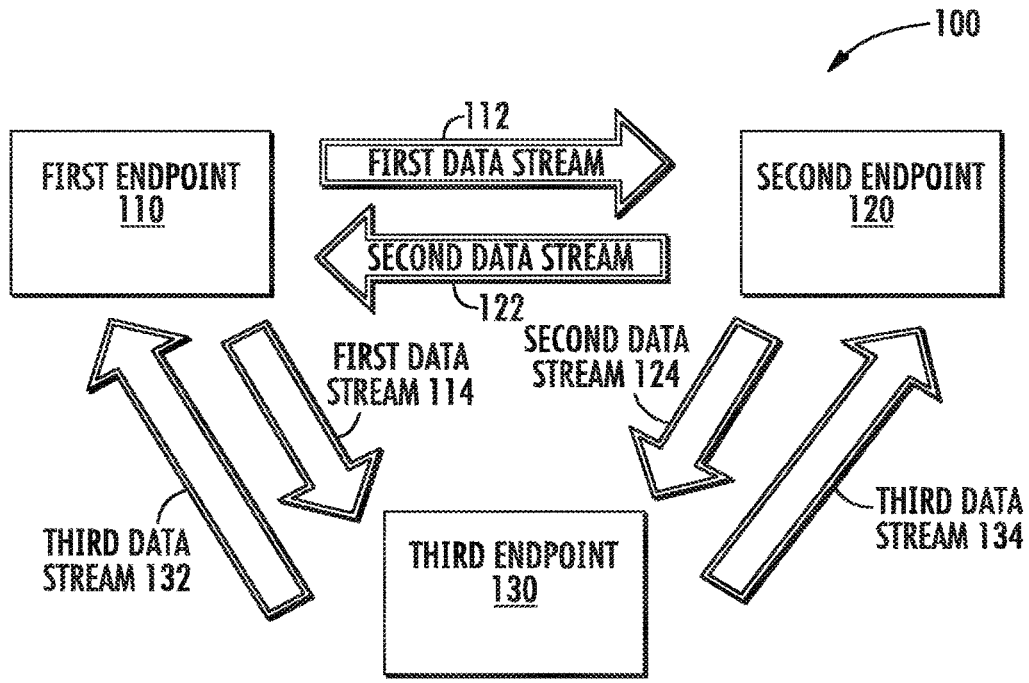
FIG. 1 is a schematic representation of a mesh-based videoconferencing technique according to various embodiments described herein.

A conference system may be configured to implement a conference service for support of end-to-end communications between participants within a conference environment, such as one or more networks through which participants may effectuate two-way communication using communication devices associated with respective endpoints of the conference. While conferencing may generally be referred to herein as videoconferencing, it is to be understood that other forms of conferencing may benefit from the systems and methods described herein. As such, other types of media data may be included in data streams in addition to or instead of video or audio data, and the herein describes methods may be similarly applicable to such data or data streams.

Two-way communication generally refers to the ability of a participant to both transmit conference data to other participants as well as receive conference data transmissions from other participants. Two-way communication may include various exchanges of conference data comprising media data such as video, audio, text, graphical, etc. data streams. In some instances, such conference data may comprise two-way communication that includes exchange of various multi-media data streams between communications devices configured to communicate between endpoints across one or more networks.

In various embodiments, a conferencing system comprises an intermediary or service providing a connection or gateway between participant endpoints. In one embodiment, the intermediary may be configured to monitor or modify conferencing data streams. Monitoring may include assessment or sampling of the conferencing environment, e.g., hardware, software, networking components, latency, capacity, or consumption, associated with participant communication devices, endpoints, network, and intermediates. For example, monitoring may include end-to-end determination of the capabilities and operation of the components and communication environment associated with the videoconference. In certain embodiments, the monitoring may include signaling to or from an endpoint and the intermediary.

Participants typically communicate with an endpoint via a client communication device, which may generally include one or more media functionalities such as recording, reproduction, display, and presentation functionalities. It will be appreciated that the various functionalities of these features may be modular, distributed, and/or integrated over one or more physical devices. Examples of client communication devices include devices associated with one or more of a microphone to record audio, a camera to record video, a speaker to play audio, and a display to display video, however, other media recorders and presenters may be used. In some instances, for example, client communication devices may include or be couplable with an integrated or peripheral device such as a touchscreen, mouse, keyboard may also be used for purposes of providing audio or video, e.g., text or graphic presentation, translation to sounds including text to speech, etc. Various client communication devices may include handheld devices, mobile or smart phones, PDAs, tablets, personal computers, monitors, cameras, speakers, projectors, phones, etc.

In one embodiment, a client communication device comprises or is configured to connect to conference system components configured to transmit and receive conference data, such as an endpoint. Transmission of conference data via the conference service may then be accomplished via transmission and receipt of conference data streams exchanged between two or more such endpoints. The conference data streams may be transmitted over public or private networks such as intranets, extranets, internets, satellite, cellular, wide-area, distributed, virtual or any other network through which conference data streams may be transmitted.

Endpoints may be configured to connect to conference system components such as networks and associated hardware, such as additional endpoints, multi-connection units (MCU), gateways, gatekeepers, routers, switches, or servers. Endpoints, conference system components, and associated networks may be hardware or software-based, may be associated with endpoints or intermediaries, as well as internally, locally, or externally hosted. As described herein, any endpoint, system component, or client device may comprise a storage medium or memory for storing data or instructions upon which an associated processor may use or execute to perform the operations or benefits herein described.

In various embodiments, endpoints include software and hardware such as codec, network connections or capabilities, multi-media connections or data ports, peripherals, mobile devices, computers, servers, routers, gateways, switches, hubs, etc. configured to effectuate the exchange, transmission, reception, and presentation of videoconference data, e.g., communications, as explained in more detail below. Endpoints may also include or be configured with encoding, compression, re-encoding, transcoding, transrating, transizing, or transmux functionalities. Endpoints may include logical or physical connections for various communication devices, such a speaker, microphone, display, keyboard, or other conferencing data ports. In one instance, an endpoint comprises a control module through which a participant may control aspects of a conference such as the exchange, transmission, reception, or presentation of the conferencing data. For example, an endpoint may comprise a user interface or connection configured to connect to a user interface such that a participant may control or monitor the conference. It is to be appreciated that unless stated otherwise, connections include wired or wireless connections and thus may include antennas, receivers, transmitters, transceivers, data ports and connectors configured for wired or wireless communication. Further, the system components described herein configured for various forms of communication may be configured or operable using any suitable protocol or programming.

In certain embodiments, client communication devices are configured for transmission and reception of transmissions originating or representative of transmissions from another participant, such as from another client communication device associated with the other participant. The transmissions may include conference data streams comprising media data, such as multi-media data, video data, audio data, etc. The conference data streams may also include other data such as metadata, e.g., codec, frame rate, frame size, etc., network capability data or statistics such as capacity, consumption, latency, contention, or bandwidth that may comprise data descriptive of the videoconference environment, which may include status and operational aspects of the conference system, service, or components including network capabilities or compatibilities of endpoints and associated participants, e.g., number of participants, service load, type or level of service, transmission, reception, or processing statistics.

In one embodiment, client communication devices comprise a transceiver for transmitting and receiving transmissions comprising data streams sent over wired or wireless communication networks or mediums. For example, a communication device may comprise a wired network connection or an antenna configured for wireless communication. In some instances both wired and wireless communication may be used with respect to transmission or reception of conference data streams. In some instances, various intermediate or central components may monitor or modify conference data streams, e.g., may mix, separate, isolate, fork, or combine conference data streams. While the term intermediate is used herein and generally illustrate as located between two or more endpoints in a conference environment, it is to be appreciated that intermediate components may be a separate network or within a network of one, more, or all endpoints. Thus intermediate does not necessarily designate location. Schematically, however, an intermediate component may be a point of connection, communication, or bridge between two endpoints. Such endpoints need not include all the endpoints in a conference and nor must the intermediate component provide the only point or route of connection or communication between the endpoints. Intermediate components could be a gateway or server between two endpoint networks. In some embodiments, intermediate components are distributed among multiple endpoints and may be embodied in hardware, software, or combinations thereof. In one embodiment, an intermediate component comprises a controller functionality configured to manage or control a conference, e.g., access, notification, calling, signaling, routing, resource management, switching, etc. The controller may be associated with a particular endpoint or endpoints. Endpoints may be configured to designate an endpoint to perform controller functions on behalf of the endpoints in the conference. In some instances, controller functions may be shared by endpoints and an intermediate component comprising a central resource. In one configuration, the controller function is provided by a central resource associated with a videoconferencing service.

In various embodiments, transmission of conference data streams may include any form or manner of transmission, e.g., analogue, digital, electrical, electromagnetic, telecommunications, wired, wireless, LAN/WAN, etc. or combinations thereof. As introduced above, in various embodiments, the conference system or service comprises a central or intermediate component. In some embodiments, the central or intermediate component is associated with an MCU conference service comprising an MCU. The MCU may comprise or be associated with a server having MCU functionality, e.g., an MCU module. The server, or another server in communication therewith, may include a controller. The controller may comprise a processor and a data storage medium configured to store instructions executable by the processor to control conference operations, e.g., promotion or demotion of conferences between mesh and MCU-based videoconferencing. In various embodiments, the instructions define fixed or dynamic rules based on one or more monitored conference parameters. In some embodiments, the controller is configured to receive or generate data comprising conference parameters from other system components, such as the MCU, endpoints, or associated networks and devices. The controller may also include monitoring capabilities with respect to monitoring videoconferencing parameters. Thus, the controller may monitor, receive, or generate data related to MCU operations, e.g., number of conferences, bandwidth, capacity, available or consumed resources, and load. The controller may also be configured to monitor, receive, or generate conferences during mesh-based videoconferencing. For example, the controller may monitor parameters including transmissions and operations for latency, bandwidth, consumption, or loss for example. Monitoring may also include receiving, requesting, determining, or generating, various capacity, capability, or configuration data related to endpoints or associated participant networks and devices.

In various embodiments, the intermediate components or described functionalities may comprise or be embodied in hardware or software including processors and storage mediums and may be configured to operate or be distributed within or among one or more servers, devices, or networks. Indeed, in some embodiments, an endpoint or associated client communication device comprises or may be configured to include one or more of the various intermediate component functionalities described herein. Participants and associated client communication devices may comprise or be part of the same or different networks and thus may connect to the conference service at the same or different endpoints. Intermediate components may be configured to receive, transmit, monitor, sample, modify, or route data streams between endpoints. In one embodiment, an intermediate component may comprise a module through which transmitted conference data streams between endpoints may pass during mesh-based conferencing. In one embodiment, the intermediate component includes a gateway configured to monitor the transmission of conference data streams transmitted between communication devices or endpoints. The gateway may comprise the controller and may comprise or be coupled to the server comprising the MCU functionality.

As introduced above, in various embodiments, the conference system includes intermediate components configured to monitor conference data streams. The conference data streams may be monitored collectively or independently. In one embodiment, an intermediate component comprises an endpoint or is otherwise integrated with or located internally or externally to a network endpoint whether located remotely or locally to the endpoint. In some embodiments, the conference system includes multiple intermediate components that may similarly collectively or independently monitor one or more of the conference data streams. Such intermediate components may be configured to communicate conference data to other components of the conference system obtained from the monitoring such as data descriptive of the conference environment, e.g., statistical data, network capabilities of the service or participant endpoints, metadata, raw or derived data.

In some embodiments, intermediate components such as a controller or associated function may communicate or apply conference data obtained or derived from various network capability parameters that may be sampled or monitored, which may include receiving network capabilities from endpoints, sampling, pinging, etc. to determine a fixed or dynamic threshold for initiating a switch between a mesh-based conference and a MCU-based conference. Such data may be descriptive of resources, capabilities, bandwidth, or other parameters with respect to one or more endpoints, participants, client communication devices, conference or services. In some embodiments, the parameters monitored and their analysis may be dynamically managed or assessed via rules and protocols, or controls and limits, that may relate to endpoint network capabilities, number of participants, MCU server or service load, client communication device capabilities, resource utilization, latency, consumption, capacity, available bandwidth, etc. In some instances, intermediate components may be configured to modify the data streams based on rules or protocols, including dynamic rules and protocols. The manner of modification may, in one embodiment, be in response to a determination obtained or at least partially derived from a sampled or monitored parameter and may include encoding, decoding, re-encoding, transizing, transcoding, transrating, transmuxing, unpacking, repackaging, mixing, isolating, redirecting or routing, or other modification of the conference data stream.

In one embodiment, the conference system is configured to implement a conference service comprising one or more first client communication devices connected to a first endpoint such as a router, gateway, or switch. Thus, conference participants may use communication devices to transmit and receive conference data within one or more data streams at the first endpoint. The first endpoint may be configured to transmit or receive the conference data streams to or from one or more additional client communication devices or endpoints. In some embodiments, the first endpoint is configured to transmit or receive the conference data streams to or from additional intermediate service components such as other endpoints or MCUs configured to transmit or receive the conference data streams to intermediate components, endpoints, or client communication devices. For example, conference data streams may be sent to multiple client communication devices from intermediate components. Thus, the conference service may include such transmissions using digital networks that connect endpoints.

In various embodiments, a videoconference system or service utilizes a meshing technique, e.g., wherein each endpoint in the conference streams data to every other endpoint in the conference, thereby providing highly scalable conferencing solutions to be built. FIG. 1 provides an overview of one meshing technique that may be incorporated into a videoconference system or method according to one embodiment. The videoconference system 100 includes a first endpoint 110 configured to transmit first data streams 112, 114 to a second endpoint 120 and a third endpoint 130. The second endpoint 120 is configured to transmit a second data stream 122, 124 to each of the first endpoint 110 and the second endpoint 120. The third endpoint 130 is configured to transmit a third data stream 132, 134 to each of the first endpoint 110 and the second endpoint 120. Accordingly, the first endpoint 110 is configured to receive the second data stream 122 and the third data stream 132, the second endpoint 120 is configured to receive the first data stream 112 and the third data stream 134, and the third endpoint 130 is configured to receive the first data stream 114 and the second data stream 134.

Each endpoint 110, 120, 130 may comprise or be configured to further connect to a client communication or multimedia device, as described above. The respective first, second, and third videoconference data streams 112, 114, 122, 124, 132, 134 may therefore comprise videoconference media data representative of a participant communication, such as video data, audio data, text or graphics data, etc., transmitted from the client communication device. Each endpoint 110, 120, 130 may comprise a connection to one or more such client communication devices.

In various embodiments, during mesh-based videoconference service or operation, the respective first, second, and third video conferencing data streams 112, 114, 122, 124, 132, 134 may comprise additional videoconference data, such as administrative data, corresponding to various parameters of the videoconference environment, such as network capabilities, e.g., bandwidth, contention, latency, resource allocation and utilization, the number of participants or client communication devices through which the respective endpoint 110, 120, 130 connects to the video conference, the type or level of service associated with one or more participants or the videoconference service. For example, an endpoint 110, 120, 130 may comprise an edge server or router associated with a private, virtual, wide-area, intranet, or extranet networks through which one or more participants connect to the videoconference service. Notably, while three endpoints 110, 120, 130 are illustrated, the number of endpoints 110, 120, 130 may be reduced or expanded. Indeed, the number of endpoints 110, 120, 130 at any given time may dynamically change as participants and associated client communication devices or endpoints 110, 120, 130 leave or join the videoconference.

The first videoconference data streams 112, 114 comprise media data representative of first participant communications. Similarly, the second videoconference data streams 122, 124 and the third videoconference data streams 132, 134 comprise videoconference media data representative of respective second participant and third participant communications. The videoconference data streams 112, 114, 122, 124, 132, 134 transmitted from a particular endpoint 110, 120, 130 are typically the same. However, in some embodiments, one or more of the data streams 112, 114, 122, 124, 132, 134 transmitted by an endpoint 110, 120, 130 may be modified by the endpoint 110, 120, 130 to, e.g., account for local network capabilities or network capabilities associated with the receiving endpoint 110, 120, 130. In one embodiment, an endpoint may be configured to modify a videoconference data stream 112, 114, 122, 124, 132, 134 for local transmission to associated client communication devices to account for local limitations with respect to local network capabilities or compatibilities, e.g., including operational, processing, or other hardware or software related limitations with respect to the local network or a connected external network or client communication device. According to various embodiments, modification of video conference data at a transmitting or even receiving endpoint may be configured to address limitations in the communication medium, latency, queuing, processing, signal conversion, bandwidth consumption/capacity, compression or decompression of data, or various resources and utilizations contributing to the videoconference experience of the participant or other participants.

The videoconference data streams 112, 114, 122, 124, 132, 134 illustrated in FIG. 1 are depicted as double lined arrows to indicate that the videoconference data streams include at least an audio data stream and a video data stream, which may be referred to herein as separate video and audio data streams. However, it is to be appreciated that in this as in the other described embodiments the data streams, e.g., data streams 112, 114, 122, 124, 132, 134, may comprise other data such as various forms of administrative data, metadata, network capability data, IM/chat data, co-browsing data, file data or file transfer data, as well as other data combinations such as an audio stream, a video stream, both a video stream and an audio stream, or a combined video/audio stream. In one embodiment, the endpoint 110, 120, 130 transmitting the data stream 112, 114, 122, 124, 132, 134 may monitor and or control the type of data, number of data streams, or combination of type and number of data streams in each data stream 112, 114, 122, 124, 132, 134 the endpoint 110, 120, 130 transmits. Thus, according to various embodiments, data streams may comprise an audio stream, a video stream, both a video stream and an audio stream, as well as a combined video/audio stream. In some embodiments, one or more endpoints 110, 120, 130 may be configured to modify the type or number of data streams according to rules or protocols, which may include analysis or determination of endpoint network or client resources as described above or videoconference system or service resources, which may also include resources of other endpoints or clients associated with other participants.

In various embodiments, the videoconference system 100 employing the mesh-based videoconference may comprise a conference manager or controller configured to provide one or more of conference management operations, which may include, any of the following among other operations, resource management or allocation, user management of controls, routing, conference creation, addition or removal of participants, or signaling between endpoints. In some embodiments, one or more conference management operations may be performed by a controller associated with an endpoint 110, 120, 130. In some embodiments, the controller may comprise a central resource comprising an intermediate component. Thus, conference management functions may be provided by a controller associated with one or more endpoints 110, 120, 130, an intermediate component, or combination thereof. The controller may be configured to monitor the videoconference environment as described above, e.g., by requesting or receiving information from endpoints 110, 120, 130 such as endpoint capabilities. In one embodiment, the controller is associated with or in communication with a videoconference service and configured to monitor the videoconference environment as well as the operation or capacity of the videoconference service in order to provide one or more control operations or management functions based on the application of monitored information to one or more rule sets. In various embodiments, one or more data streams 112, 114, 122, 124, 132, 134 may be transmitted through an intermediate component comprising a gateway. The gateway may be associated with or in communication with the controller. In one embodiment, the gateway or the controller is also associated with or in communication with an MCU or MCU functionality, which may be associated with the videoconference service. For example, in one embodiment, the controller may be configured to monitor the operation or capacity of the MCU as well as the mesh-based videoconference 100, as described in more detail below. In one embodiment, upon determination that monitored operation or capacity has meet a threshold defined or determined through the one or more sets of rules, the controller is configured to initiate a switch to an MCU-based videoconference that is seamless from the perspective of the participants or presentation of the videoconference video and audio data on client or user media or communication devices. In one embodiment, initiation of a switch may comprise signaling one or more endpoints 110, 120, 130 to switch to an MCU-based videoconference operation, e.g., to transmit a combined video/audio or other data stream to a destination associated with the MCU and to receive a mixed video/audio stream or other data stream mixed by the MCU, which may be comprise a plurality of mixed combined video/audio data streams, separate video and audio data streams, or a combination thereof. In some embodiments, the controller may initiate the switch by signaling to the MCU to call the one or more endpoints 110, 120, 130 to be switched. In certain embodiments, the controller is configured to coordinate the switch in conjunction with the one or more endpoints 110, 120, 130 to be switched and the MCU to create or integrate MCU-based videoconference from the mesh-based conference and participants such that switch is seamless to participants, as explained in more detail below.

Figure 2:
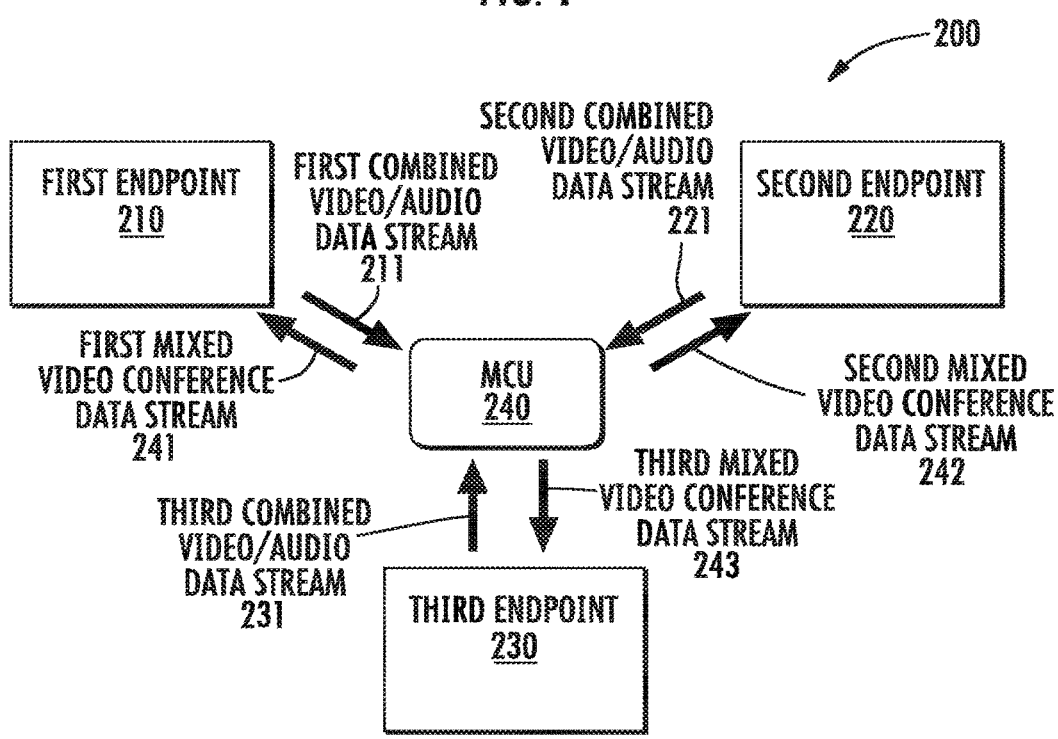
FIG. 2 is a schematic representation of an MCU-based videoconferencing technique according to various embodiments described herein.

Videoconference systems comprising services implementing a mesh technique, as depicted in FIG. 1, include scaling advantages over MCU-based videoconference techniques by providing flexibility to grow with demand at reduced costs. FIG. 2 illustrates a videoconference system 200 implementing an MCU-based videoconference service. In various embodiments, the videoconference system 100 illustrated in FIG. 1 may be configured to implement the mesh-based videoconference schematically depicted in FIG. 2. Thus, the various capabilities and functions described above with respect to the system 100 of FIG. 1 may likewise apply to the similar components of the system 200 FIG. 2. Accordingly, for brevity, all such capabilities and functions may not be described again but should be considered to be applicable to the system of FIG. 2 unless stated otherwise.

The videoconference system 200 employing an MCU-based videoconference may comprise a first endpoint 210 configured to transmit a first combined video/audio data stream 211 representative of at least a first participant videoconference media data communication, a second endpoint 220 configured to transmit a second combined video/audio data stream 221 representative of at least a second participant videoconference media data communication, and, as shown here, a third endpoint 230 configured to transmit a third combined video/audio data stream 231 representative of at least a third participant videoconference media data communication. The videoconference system further includes an MCU 240 configured to receive the first, second, and third combined video/audio data streams 211, 221, 231. The MCU 240 comprises a processing module configured to mix the combined video/audio data streams 211, 221, 231. The MCU 240 is further configured to transmit first, second, and third mixed videoconference data streams 241, 242, 243 for reception at the first, second, and third endpoints 210, 220 230. It is to be appreciated that the various reception and transmission of data streams 211, 221, 231, 241, 242, 243 may be performed by any combination of hardware or software known in the art using any suitable protocol or combination of protocols. In some embodiments, the mixed videoconference data streams 241, 242, 243 may have the videoconference data associated with the receiving endpoint 210, 220, 230 removed. In one embodiment, a receiving endpoint 210, 220, 230 is configured to modify, e.g., format, the combined video/audio data stream 241, 242, 243 received to control or modify the presentation of the data by endpoint processes, e.g., to remove associated participant data or apply a particular codec operation. As described above with respect to FIG. 1, the videoconferencing system 200 may comprise a gateway or controller. The gateway or the controller may be associated with an endpoint 210, 220, 230, comprise one or more intermediate components, or combination thereof. The gateway, controller, or MCU 240 may comprise or be embodied in hardware or software and may include central or distributed components including one or more servers which may be onsite of one or more participants or endpoints, remote, internet or other network based, such as cloud based. In one embodiment, a videoconferencing service comprises an MCU 240 having a processing module for processing videoconferencing data, a controller module for performing conference management operations with respect to the MCU 240. In some embodiments, the controller module includes the controller for performing conference management operations with respect to the mesh-based videoconference 100 based on the videoconference environment, e.g., endpoint capacities, and monitored MCU services operation, as described above with respect to FIG. 1.

An MCU may function as a central resource and may limit performance of the videoconference 200. For example, the capacity of the MCU 240 and associated resources may be a limitation to the performance of the videoconference service with respect to quality, number of conferences that may be held, or participants that join concurrently. Video processing performed by the MCU 240, for example, may be resource intensive and generally require extensive infrastructure such as expensive dedicated hardware or significant quantity of commodity servers to scale to large numbers of conferences or participants. Conversely, a mesh-based videoconference 100 tends to place higher network bandwidth requirements on each participant, endpoint 110, 120, 130, or associated network. To an extent, in various embodiments, this may be offset by intelligently changing the video resolution sent by each participant or endpoint 110, 120, 130 to the other participants or endpoints 110, 120, 130 as the number of participants changes. As the number of participants increases, for example, the area available on a client communication device, e.g., display device, of a participant may be decreased to show all the other participants. Consequently, the video resolution of each videoconference video data stream 112, 114, 122, 124, 132, 134 may be reduced. This reduction may also reduce the bandwidth consumed by each stream 112, 114, 122, 124, 132, 134 and offset the increase in bandwidth consumed by the additional streams. The offset, however, may tend to be only partial because, as the video resolution decreases, video codecs have less opportunity to compress the image while maintaining the same video quality. In other words, while lower video resolution may consume less bandwidth, in real terms, it may be proportionately more than that of higher video resolution.

In various embodiments, the videoconference systems 100, 200 comprises a videoconference service configured for seamless transitioning between mesh-based conferencing, as generally shown in FIG. 1, and MCU-based videoconferencing, as generally shown in FIG. 2. For example, when a mesh-based videoconference comprises large numbers of participants, videoconference performance may benefit by switching or transitioning to the use of MCU-based conferencing using an MCU functionality, e.g., a server comprising MCU functionality through which videoconference data may be transmitted, received, and processed. The point at which the benefits of mesh-based videoconferencing may be offset by potential drawbacks that interfere with the performance of the videoconference, which may be at least partially improved by switching to MCU-based videoconferencing, may vary according to the specifics of each deployed videoconference service and the capabilities or relative capabilities of each endpoint or each participant's endpoint. For example, network capabilities that may affect performance in mesh-based video conferencing include bandwidth, contention, and latency. Network or endpoint capabilities may further include compatibilities with respect to ability to produce a seamless switch between videoconferencing. For example, the controller may determine that a participant endpoint is unable to seamlessly display video content during the transition or may be unable to support MCU-based or mesh-based videoconferencing. Thus, the controller may retain the videoconference in the compatible videoconference. On the other hand, if participant endpoints in a videoconference are in an MCU-based videoconference and the controller receives a request from a new participant to join the conference, the controller may determine that the endpoint associated with the request is unable to support MCU-based videoconferencing and therefore the controller may demote the videoconference to mesh-based in order to accept the request of the new participant to join the videoconference.

Figure 3A:
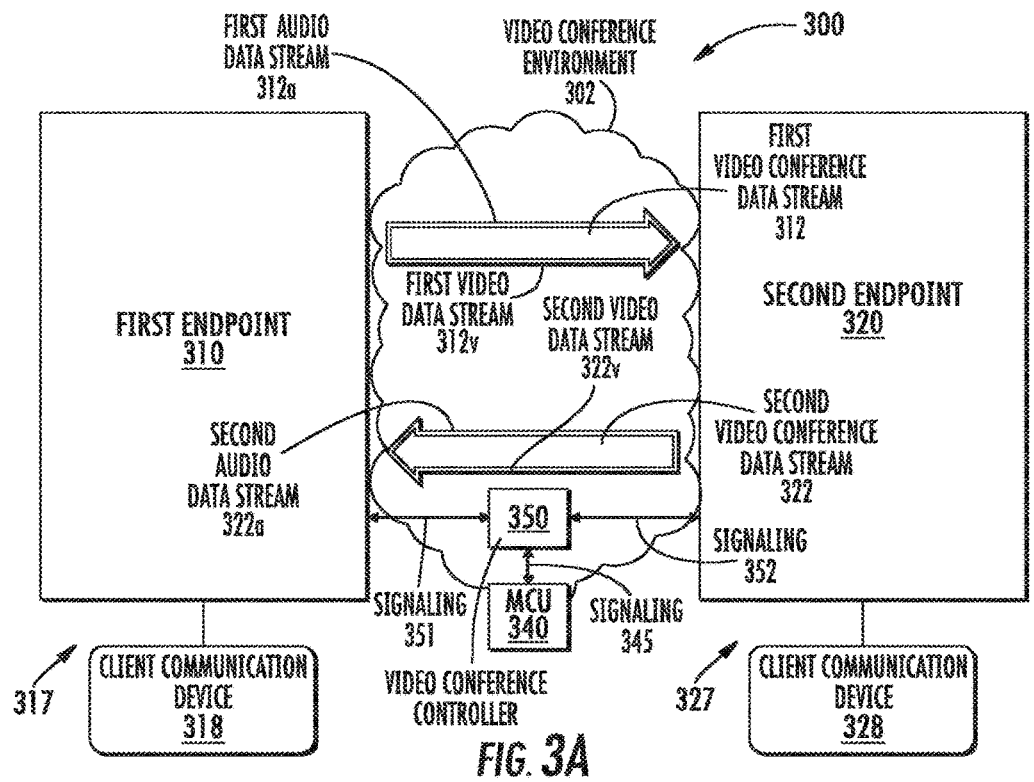
FIGS. 3A & 3B are schematic representations of a videoconference system for switching from mesh-based to MCU-based conferencing according to various embodiments described herein.
Figure 3B:
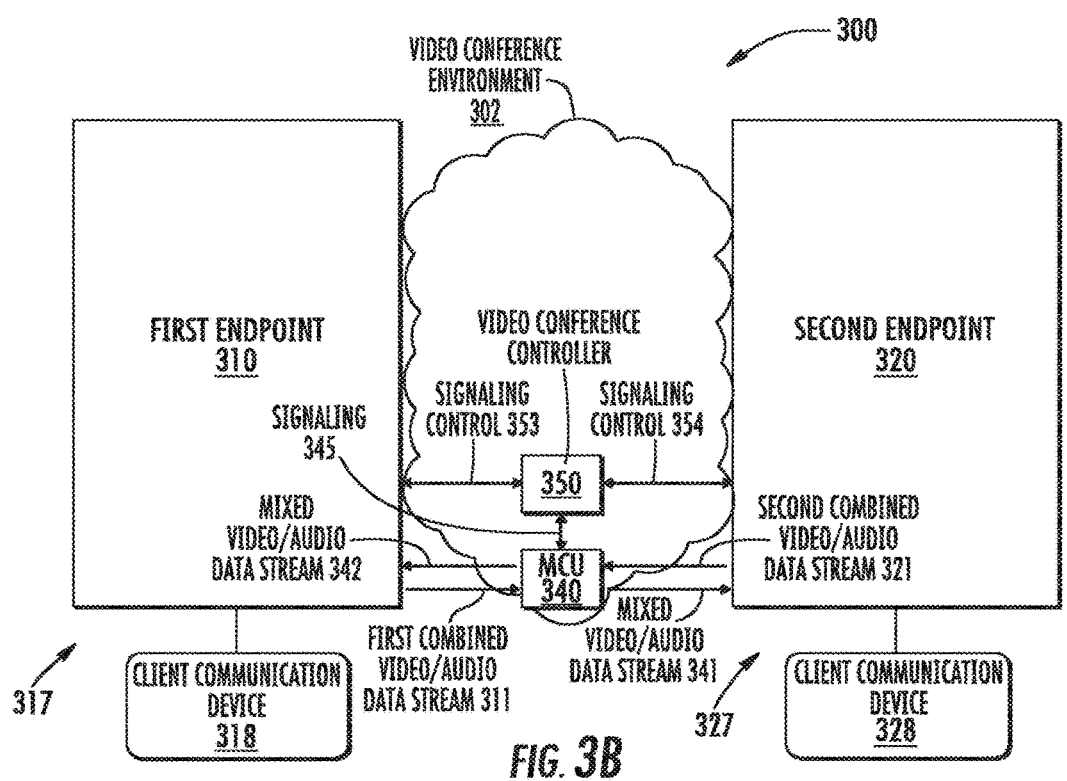

FIGS. 3A-3B schematically illustrate a switch from mesh-based to MCU-based videoconferencing according to one embodiment. In FIG. 3A, the videoconference system 300 is shown operating in a mesh-based videoconference as in FIG. 1, however, for brevity, only two participant endpoints are depicted. Notably, in actual operation additional or fewer endpoints may be used. It is to be appreciated that while a videoconference typically requires at least two participants, in various embodiments, the videoconference systems described herein may include just a device configured for use as an endpoint in the operation of a videoconference or just an intermediate component configured for use in the operation of a videoconference. As described in FIGS. 1 and 2, the videoconference system 300 comprises a videoconferencing device configured for use as a first endpoint 310 of a videoconference. The first endpoint 310 may be associated with one or more videoconference participants via one or more client communication devices 318 and be configured to transmit a first videoconference data stream 312 comprising a separate first video data stream 312v and a first audio data stream 312a for transmission through a videoconference environment 302, e.g., between one or more networks, to a second endpoint 320 associated with one or more second participants and associated client communication devices 328. It is to be appreciated that any suitable configuration of endpoints 310, 320 and client communication devices 318, 328 may be used to accomplish the operations of the videoconference. For example, one or more client communication devices 318, 328 or functionalities may be physically or logically integrated within the same device or module, which may be the same or different than the associated endpoint 310, 320. Thus, participants may connect to the video conference using a client communication device 318, 328 comprising a cell phone, smart phone, tablet, or dedicated device, for example, which may be configured to operate as an endpoint 310, 320 or may connect to an endpoint environment 317, 327 comprising a private network, for example, as described above. The first endpoint 310 may be configured to receive a transmission of a second videoconference data stream 322 comprising a separate second video data stream 322v and a second audio data stream 322a transmitted from the second endpoint 320. The videoconference system 300 is configured to operate in a videoconference environment comprising a first endpoint network environment 317, a second endpoint network environment 327, and a central or intermediate network environment 302 through which the videoconference data streams 312, 322 are transmitted.

An MCU 340, which may be an MCU functionality, is associated with the central or intermediate network videoconference environment 302. The MCU 340 comprises MCU functionality and may include a network or server having MCU functionality. For example, the MCU 340 may comprise a server configured with a logic control module including a processor configured to execute instructions stored in a data storage medium associated with the server. Thus, in some embodiments, the MCU 340 may include a controller to control MCU 340 operations. The controller may be the same as or be configured to operate in conjunction with a videoconference controller 350 configured to function as a conference manager with respect to switching between mesh-based and MCU-based videoconferences. Thus, the controller 350 may be configured to send and receive 345 or otherwise receive data from the MCU 350 regarding current or prospective MCU operations, including capacity and other capabilities, for example. The videoconference controller 350 may also be configured to communicate 351, 352 with one or more of the endpoints 310, 320, such as receiving requests to switch videoconference configuration or for initiating such switches when a trigger event threshold has been identified or determined by the controller 350. For example, upon receiving requests to switch to a mesh-based videoconference the controller may analyse received videoconference data from endpoints 310, 320 and the MCU 340 or request such data to determine if a relevant trigger event has reached a threshold. Notably, in some embodiments, the controller 350 or the MCU 340 or MCU functionality may be associated with one of the endpoints 310, 320. Other configurations may be used, for example, the MCU 340 may also be associated with the controller 350, one or both may be distributed, remote with respect to the other, local, or embedded.

As illustrated in FIG. 3B, upon the occurrence of a threshold trigger event as determined by the controller 350, the first endpoint 310 is configured to transmit a first combined video/audio data stream 311 to the MCU 340 and receive a mixed video/audio data stream 342 from the MCU 340, wherein the mixed video/audio data stream 342 comprises second video data and second audio data transmitted by the second endpoint to the MCU 340. The MCU 340 is configured to receive the first combined video/audio data stream 311 and transmit a mixed video/audio data stream 314 comprising the first combined video/audio data stream 311. The switch may be initiated by the controller 350 via signaling the switch 351, 352 to the endpoints 310, 320. The signaling may include address, conference identifying data, formats, as well as compatibilities of participants. In one embodiment, the controller 350 is configured to provide signals to the endpoints 310, 320 instructing the endpoints 310, 320 to switch from one videoconference base to another and to begin transmission of the corresponding data streams 312, 322, 321, 321. The controller 350 may also create a new videoconference or signal 345 the MCU 340, e.g., its controller, to create a new videoconference or otherwise initiate the switch. As described above, the MCU 340 may comprise a processor module which may include a mixer configured to mix the data streams 311, 321 from one or more endpoints 310, 320. The second video data and second audio data of the combined video/audio data stream 342 comprise a second combined video/audio data stream 321 transmitted to the MCU 340 by the second endpoint 320. In one embodiment, the first or second mixed video data streams 341, 342 further comprise one or more third video data and audio data transmitted by one or more respective third endpoints via a third combined video/audio data stream to the MCU 340, as shown in FIG. 2. Notably, videoconference data streams 322, 312, 311, 321, 341, and 342 may comprise or be augmented with additional data streams or data such as administrative data, metadata, network capability data, IM/chat data, co-browsing data, file data or file transfer data. During MCU-based videoconferencing, the controller 350 may be configured to maintain signaling control 353, 354, 347 with respect to endpoints 310, 320 and the MCU 340 as well as manage the conference and MCU resources. As described in more detail below, in various embodiments, the controller 350 is configured to monitor capacity of the MCU 340 initiate a switch demoting the videoconference from MCU-based to mesh-based.

FIGS. 4A and 4B illustrate a switch from mesh-based to MCU-based videoconferencing according to another embodiment. In this embodiment, the videoconference system 400 is configured to provide a videoconference service within a videoconference environment comprising at least one central or intermediate videoconferencing network environment 402 and at least two endpoint environments 417, 427 comprising at least a first and second endpoint 410, 420 each associated with at least a first and second participant via a respective first and second client communication device 418, 428. The central or intermediate network environment 402 may include one or more communication mediums or network environments, such as satellite, telecommunication, electromagnetic, electronic, wired, or wireless communication mediums or wide-area network, internet, virtual network, cloud, private network, distributed network, peer-to-peer or small world network, for example. The first endpoint environment 417 comprises the first endpoint 410 and, in some embodiments, one or more first endpoint networks including the at least one first client communication device 418 configured to be associated with at least one participant during operation of the videoconference service. The second endpoint environment 427 comprises the second endpoint 420 and, in some embodiments, one or more second endpoint networks including the at least one second client communication device 428 configured to be associated with at least one participant during operation of the videoconference service. In one embodiment, the first or second endpoint environments 417, 427 comprise a local, private, virtual, intranet, or extranet, e.g., a client communication device 418 comprising an extranet connection to a private network comprising the first endpoint 410. For brevity, only two endpoints 410, 420 are illustrated, it is however to be appreciated that additional endpoints may be included such that additional endpoints and associated participants may participate in the videoconference service.

The first endpoint 410 is configured transmit the first videoconference data stream 412 comprising at least one separate first video data stream 412v and first audio data stream 412a to the second endpoint 420. Transmission of the first videoconference data stream 412 may include transmission of one or more portions of the first videoconference data stream 412 to or through the central or intermediate videoconference environment 402 to an intermediate component 460. The second endpoint 420 is configured to transmit the second videoconference data stream 422 comprising at least one second separate video data stream 422v and second audio data stream 422a to the first endpoint 410. Transmission of the second videoconference data stream 422 may include transmission of one or more portions of the first videoconference data stream 422 to or through the central or intermediate videoconference environment 440 to the intermediate component 460.

The intermediate component 460 may also comprise a gateway or controller 450 coupled with an MCU 440 or functionality, such as an MCU server or service, as described above. In some embodiments, the first or second endpoints 410, 420 may comprise a router, gateway, switch, hub, or server, for example, through which participants connect to the intermediate component 460, other endpoints 410, 420, and, hence, the videoconference. Additionally, in some embodiments, videoconference data streams 411, 412, 421, 422, 441, 442 may comprise or be augmented with additional or other data or data streams, such as administrative data, metadata, network capability data, IM/chat data, co-browsing data, file data or file transfer data, as well as other data combinations such as an audio stream, a video stream, both a video stream and an audio stream, or a combined video/audio stream.

As described above, the system 400 is configured for communication of videoconference data through a central or intermediate videoconference environment 402 through which the data streams 412, 422 are transmitted. The central or intermediate videoconference environment 402 includes the intermediate component 460. The intermediate component 460 is configured to monitor the data stream transmissions 412, 422. For example, the intermediate component may comprise the controller 450 configured to manage videoconference signaling and resources, as described above, and may comprise a server configured to monitor the videoconferencing environment and execute instructions or apply rules thereto to effectuate desired utilization or optimization of MCU resources. The controller 450 may monitor the videoconference data streams 412, 422 or a portion thereof. For example, the controller 450 may be configured to send and receive signaling control portions, e.g., network capability, capacity, number of participants, etc., of the data streams 412, 422 for managing the video conference and determining levels or existence of various trigger events associated with the videoconference. Thus, the intermediate component 460 need not necessarily receive and transmit the video data stream 412v, 422v portions and the audio data streams 412a, 422a portions of the data streams 412, 422 during mesh-based conferencing, rather the controller 450 may sample or receive a separately defined signaling control portion of the data streams 412, 422 comprising data descriptive of the videoconference environment as described above. Indeed, in some embodiments, during mesh-based operation, the intermediate component 460 is not responsible for performing processing operations with respect to video 412v, 422v and audio 412a, 422a portions of the data streams 412, 422.

According to various embodiments, the controller 450 may comprise a server configured to control or monitor various MCU 450 functions and operations with respect to multiple videoconferences as well as associated network capacities of participants 418, 428 to control endpoint 410, 420 access to the MCU 440. The controller 450 may, for example, comprise a gateway to the MCU 440, either of which may comprise the same or different networks. In one embodiment, the controller monitors videoconference parameters such as number of participants, duration, participants having reduced or suppressed data, number videoconferences, MCU load, and network capacities. The controller 450 may include a storage medium or memory configured to store instructions or rules and a processor configured to execute the instructions or apply the rules to the monitored parameters or data generated therefrom. For example, as described above, the instructions may define dynamic rules based on videoconference parameters such as MCU load. The rules may therefore be applied at various levels according to a monitored operation of the MCU 440. If the controller 450 determines from the rules that a trigger event, such as number of participants, has reached a threshold level, the controller 450 may promote a mesh-based videoconference to an MCU-based videoconference. The promotion may be seamless, e.g., from the perspective of the user, because the switch may incorporate or simulate the videoconference presentation and display of the prior mesh-based conference.

While switching between mesh-based and MCU-based videoconferencing has been generally described herein with respect to promotion from mesh-based to MCU-based videoconferencing, the system may further include demotion from MCU-based videoconferencing to mesh-based conferencing. In various embodiments, the determination for promotion and demotion consider the same parameters such as MCU load, endpoint network capabilities or compatibilities. For example, during an MCU-based videoconference, the controller may determine that a trigger event parameter such as the number of participants has been reduced or reduced to below a fixed or dynamic threshold. The controller may then demote the videoconference to mesh-based. As above, the endpoints may be configured such that the switch is seamless. In some instances, the determination may consider the endpoint capabilities. For example, the controller may determine the all the remaining endpoints comprise mesh-based capabilities or compatible mesh-based capabilities prior to demoting the videoconference. In one embodiment, application of rules to demote, or promote, comprise a time factor. For example, just prior to the end of a videoconference, the number of participants may drop. Thus, the controller may delay demotion to mesh-based videoconferencing for a fixed or dynamically determined period of time.

Figure 5:
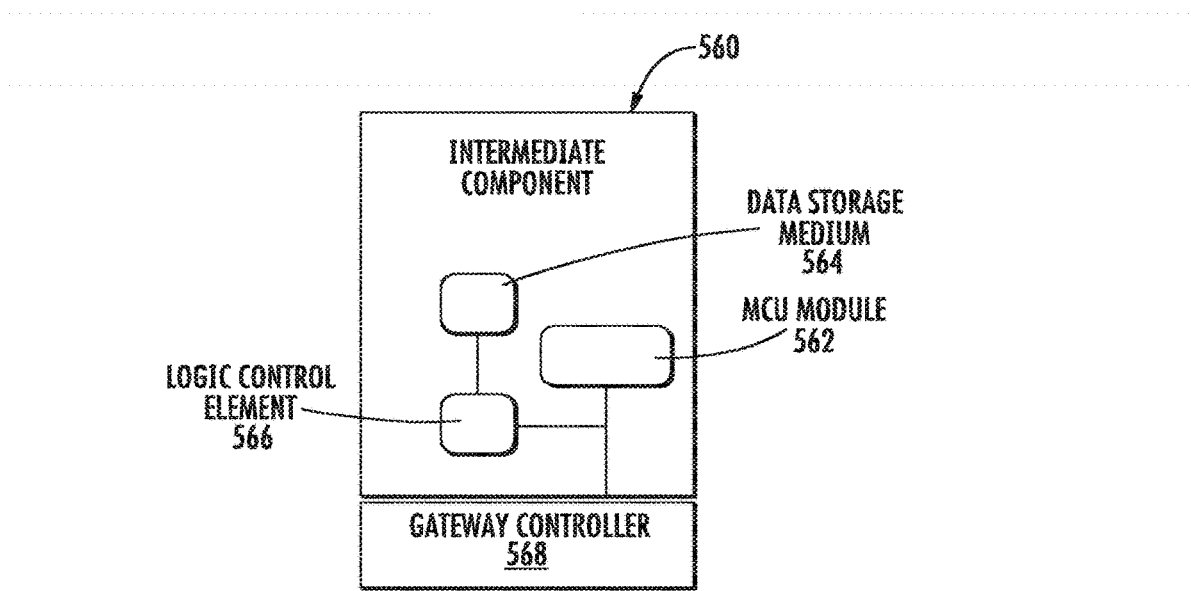
FIG. 5 is a schematic representation of an intermediate component comprising an MCU according to various embodiments described herein.

FIG. 5 is a schematic of an intermediate component 560 comprising one or more servers according to various embodiments. Intermediate component 560 may be similar to intermediate components 350, 460 and may comprise one or more networks as well as centralized or remote devices or functionalities distributed among multiple hardware or software embodiments. The intermediate component 560 comprises an MCU module 562 configured to provide MCU services, a data storage medium 564, and a logic control unit element 566, such as an electronic processor, configured to execute an MCU functionality program. The intermediate component 560 further comprises a gateway controller 568 configured to monitor videoconference data streams of mesh-based videoconferences, e.g., as shown in FIGS. 4A-4B. The gateway controller 568 may also monitor videoconference data streams during MCU-based videoconferences. Similarly, as also shown in FIGS. 3B and 4B, the gateway controller 568 may be configured to monitor or receive operation data from the MCU module 562 during mesh-based or MCU-based videoconferencing. The gateway controller 568 may operatively associate with the logic control element 566 and data storage medium 564 to perform controller operations. The MCU service may utilize the gateway controller 568 for receiving, sampling, or determining videoconference data or parameters relative to the respective endpoint network capabilities from which threshold or switching may be determined. For example, in one embodiment, the data storage medium 566 is configured to store a file comprising instructions and rules with respect to endpoint or network capabilities or compatibilities, trigger event parameters, load capacities, tables or statistics with respect to data processing, manipulation, monitoring, bandwidth, latency, contention, encoding, compression, threshold optimization statistics, switching protocols, etc. for determining thresholds and switching optimization. The logical control element 566 may be configured to access the files in the data storage medium 566 to calculate, identify, or generate thresholds or levels. Thus, the MCU service or component thereof may be configured to monitor the transmission of the videoconference data for threshold analysis and determination of trigger event parameters. The gateway controller 568 may be configured to control various MCU functions and endpoint access to an MCU module 562. In one embodiment, the gateway controller 568 monitors videoconference parameters such as number of participants, duration, participants having reduced or suppressed data, number videoconferences, MCU load, network capacities. The gateway controller 568 may access the storage medium 564 for instructions or rules executable by the logic control element 566, e.g., including a processor, for application of the rules to the monitored parameters or data generated therefrom. The gateway controller 568 may be configured to receive or approve requests for promotion of videoconference. In some instances, the gateway controller 568 monitors videoconference parameters and applies the rules. For example, the gateway controller 568 may determine that the number of participants has exceeded a fixed or dynamic threshold of participants and thereafter promote the videoconference. The gateway controller 568 may thus be configured to monitor mesh-based videoconferences and the endpoints for determination of switches. As described above, the gateway controller 568 may also be configured to monitor MCU-based videoconferences to determine demotion to mesh-based videoconferencing, e.g., based on rules defining thresholds and including capabilities and capacities of the participant endpoints. In preferred embodiments, the gateway controller 568 is not involved in processing the media data.

In various embodiments, the systems 300, 400 for FIGS. 3A-4B are configured to switch from mesh-based videoconferencing (FIGS. 3A & 4A) to MCU-based videoconferencing (FIGS. 3B & 4B). The system is configured to make a decision to switch from mesh-based videoconferencing to MCU-based videoconferencing upon the occurrence of a triggering event or associated parameter comprising a threshold related to the operation of the videoconference service, such as the MCU service or network capabilities of endpoints. For example, in one embodiment, the system 300, 400 is configured to switch from mesh-based videoconferencing to MCU-based videoconferencing upon a determination that a pre-determined, e.g., fixed, or dynamically determined number of participants for the service or network capabilities of one or more of the participants or endpoints, either with or without adaptive bitrate control in place, has been exceeded. In another embodiment, the system 300, 400 is configured to switch from mesh-based videoconferencing to MCU-based videoconferencing upon a determination that a number or proportion of the participants have exceeded network capabilities and have had their video resolution sent from and to their device reduced, e.g., adaptive bit rate control, or even suppressed, e.g., audio only, to maintain the overall experience for the majority of participants while minimizing the need for central MCUs.

The trigger event may comprise at least one or both of a service event and a network capability of at least one participant of the videoconference. For example, in configurations where endpoints are configured to transmit and receive videoconference data directly from another endpoint without an intermediate component, such as a server, gateway, or other component configured to analyse or receive MCU service load data, such as FIGS. 3A & 3B. The threshold trigger events may be fixed or predetermined such that MCU service load is not used, e.g., a service event may comprise exceeding a number of participants for the videoconference service. Thus, endpoints may be configured to exchange or monitor network capabilities. For example, the first endpoint may be configured to monitor network capabilities of the second endpoint, e.g., during adaptive bit rate control. In one embodiment, endpoints are configured to communicate with the MCU service to receive service load data. In one embodiment, an endpoint is configured to initiate a switch from mesh-based to MCU-based upon determination that network capabilities have been exceeding. The endpoint may send a request to the MCU to switch to MCU service. The MCU service may check the level of service associated with the videoconference to make a determination if the switch should be allowed. The determination may relate to the MCU service load in relation to the service level. For example, if the service load is low, videoconferences with low level service may be allowed to switch to MCU-based service. However, if MCU service load in relation to the service level associated with the videoconference, which may be provided by the endpoint when the switch is requested, is high, the switch may not be allowed. Thus, whether requests to switch to MCU-based videoconferencing may depend on a current level of allowed services, such as low, medium, high, preferred, etc. Similarly, trigger events, trigger event parameters, or thresholds for the parameters may be defined by a current allowed level or range of allowed levels based on MCU service load.

In one embodiment, endpoints are configured to calculate or receive transmission statistics from other endpoints, which may be used to calculate parameters of trigger events for threshold determinations with respect to switching from mesh-based to MCU-based videoconference service. For example, a first endpoint may initiate a switch from mesh-based videoconferencing to MCU-based videoconferencing when the number of participants or endpoints exceeds a predetermined number. In some embodiments, the endpoint may be configured to initiate the switch from mesh-based videoconferencing to MCU-based videoconferencing based on a determination that the network capabilities of one of the first or second endpoints has been or is likely to be exceeded. In some embodiments, one or more of the endpoints are configured to monitor network capability parameters for determination of trigger event thresholds. In some embodiment, endpoints are configured to communicate with an MCU, e.g., a server, to obtain at least a portion of either identification of trigger events or parameters or one or more threshold criteria. The threshold criteria may be used to define thresholds for trigger event parameters. In one embodiment, the endpoint is configured to communicate the occurrence and determination that a trigger event parameter has reached a threshold. Initiation of the switch may comprise communication between the endpoints to initiate MCU-based videoconferencing or communication with the MCU to initiate MCU-based video conferencing with the endpoints.

As introduced above, according to various embodiments, the controls and limits are dynamically variable based on current load of the MCU service. For example the trigger event threshold level for switching may increase dynamically for one or more parameters based on the number of MCU conferences and participants in use so that as many conferences as possible are kept as mesh-based as the number of the MCU-based conferences increases in order to not exceed the finite capacity of the MCU. Alternatively, in some embodiments, the threshold limits for certain parameters may vary by service level, such as a preferred service level. Thus, the service level or type of service may be used to shape switching behaviour or determinations such as in relation to a service level, so that the quality of videoconference service is preserved for preferred or higher service levels over those with lower service level. Thus, an endpoint as shown in FIG. 3 may request threshold updates from the MCU service regarding dynamic thresholds related to the current load of the MCU.

In an arrangement where the MCU service monitors the mesh-based transmissions, environment, or capabilities of the participant networks, which may include endpoint capabilities/compatibilities, as shown in FIG. 4, for example, the MCU service may perform dynamic calculations with respect to MCU service load and network capabilities to dynamically maintain thresholds to optimize videoconferencing performance based on load, network capabilities, or service level. Thus, according to various embodiments, the videoconference system is configured to determine and initiate a switch from mesh-based videoconferencing to MCU-based videoconferencing based on rules such as MCU service load, endpoint capability or capacity, thereby ensuring that the move of underlying platforms is seamless and invisible to the user.

In one embodiment, the MCU comprises a single stand-alone unit. In another embodiment, the MCU or MCU functionalities may be distributed over multiple devices or locations. In one embodiment, an endpoint comprises or is configured to include MCU functionality. In a further embodiment, multiple endpoints may comprise or be configured to include MCU functionality wherein the respective MCU functionalities may cooperate or share operations, resources, bandwidth, etc., e.g., intelligently, to optimize performance within a variable and dynamic environment. In one embodiment, at least a portion of the MCU includes cloud-based operation.

To provide an optimal experience to users the switch from meshed to MCU conferencing is configured to be seamless. That is, in one embodiment use of MCU and central network elements is optimized such that the use of MCU-based videoconferencing only occurs when the number of participants reaches the threshold point. To achieve this, the endpoints may be configured with intelligence built-in to switch from sending and receiving multiple streams to sending and receiving a single stream from and to the MCU. In these or other embodiments, the endpoints may also be configured to slice up the inbound media data, e.g., the video media data portion of the data stream, to display in the same layout as the mesh-based videoconference. Therefore, the switch may appear seamless to participants. MCUs typically have a set number of layouts for display which needs to be mapped by each endpoint to the style or format used for the mesh conference.

In various embodiments, when switching from mesh-based to MCU-based videoconferencing, a central or intermediate component may comprise a signaling element configured to include metadata in a data stream wherein the metadata describes the format or style layout of the video produced by the MCU. Alternatively, the endpoints may be configured to maintain the same layout despite the switch. Similarly, depending on the MCU configuration, the MCU may stream the same view format to every participant or may stream a tailored view to each participant, such as removing the video from a participant from the video sent to that participant.

Figure 6:
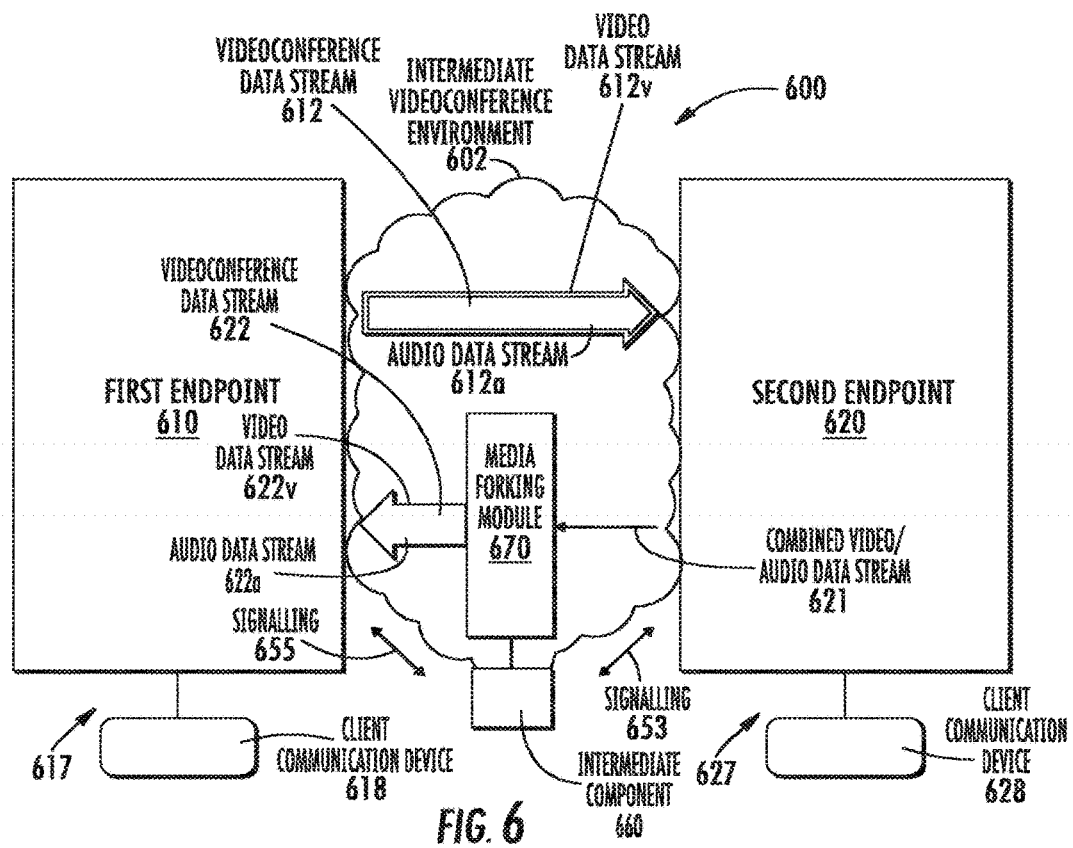
FIG. 6 is a schematic representation of a videoconference system for forking videoconference data streams according to various embodiments described herein.

According to certain embodiments, a switch from mesh-based to MCU-based video conferencing requires that all participants switch. As the switch may be triggered by the network constraints of one or more participants, it is possible that some videoconference services may have a lower switch point forced on the service than is desired due to a low threshold associated with limited network capabilities of one or more participant endpoints. Accordingly, in one embodiment, referring to FIG. 6, a video conferencing system 600 comprises an intermediate component 660 located within an intermediate videoconference environment 602 that may include one or more endpoints 610, 620 or be positioned between at least two endpoints 610, 620. It is to be appreciated that in some embodiments, the intermediate environment 602 may comprise one or more networks, which may be the same or different than a network associated with one of the endpoints 610, 620, and may include various hardware or software. As shown in FIG. 6, the intermediate component 660 includes a media forking module 670 that acts as an intelligent switch. In this embodiment, rather than have a first endpoint 610 send a videoconference data stream 612 comprising a separate video data stream and audio data stream, e.g., separate audio data stream 612*a* and video data stream 612*v* to every other participant endpoint, as shown for endpoint 610, the second endpoint 620 is configured to send a combined video/audio data stream 621 to the intermediate component 660 which then forks the media via the media forking module 670 into a videoconference data stream 622 comprising a separate audio data stream 622*a* and video data stream 622*v* that is sent to each of the other participants or endpoints 610. For brevity, only two endpoints are shown, however, the system 600 may be configured such that additional endpoints may join the videoconference. Each participant endpoint may still receive an audio data stream 612*a*, 622*a* and a video data stream 612*v*, 622*v* for each of the other participants, but, in this embodiment, the data stream 612, 622 may come from any combination of directly from endpoints or from the media forking module. Thus, as it is common for network connections, especially internet connections, to be asymmetric with significantly higher download capacity than upload rate, the videoconference system 600 comprising the intermediate component 660 may utilize forking to allow participants with this asymmetric connection to participate in larger conferences without having to resort to using MCU-based videoconferences or reducing the switch point for the service. While this embodiment may not require the use of a central resource, because the intermediate component that includes the media forking module acts as an intelligent multiplexing/multicasting switch that does not have to process the video, it may provide significantly better scalability than an MCU or incorporation of an MCU functionality. Consequently, the intermediate component 660 may enable an improved experience for each participant without the infrastructure investment that may be otherwise required through the use of an MCU alone.

In one aspect of the present disclosure, a videoconferencing device may be configured for use as a first endpoint of a videoconference, wherein the first endpoint is associated with one or more videoconference participants and is configured to transmit a first video data stream and a first audio data stream for transmission to a second endpoint associated with one or more second participants of a videoconference. The first endpoint is configured to receive a transmission of a second video data stream and a second audio data stream transmitted from the second endpoint, wherein, upon the occurrence of a trigger event, the first endpoint is configured to transmit a first combined video/audio data stream to an MCU and receive a mixed video/audio data stream from the MCU, and wherein the mixed video/audio data stream comprises second video data and second audio data transmitted by the second endpoint to the MCU, which may include the video and audio media data of the combined video/audio data stream from the second endpoint as wells as video and audio media data of combined video/audio data streams or separate video and audio data streams from additional videoconference participants or endpoints.

According to the above, the trigger event comprises at least one or both of a service event and a network capability of at least one participant of the videoconference. The service event may comprise exceeding a fixed number of participants for a videoconference service. Network capability may include exceeding the network capabilities of the first endpoint or the second endpoint. The network capability may also comprise exceeding the network capabilities of the first endpoint or the second endpoint with or without adaptive bit rate control. The network capability may comprise exceeding the network capabilities of a proportion of endpoints that have had video data reduced or suppressed. In one instance, the threshold for the trigger event is dynamically variable based on the current load on the MCU. The threshold for the trigger event may increase dynamically based on the number of MCU conferences and participants in use so that as many conferences as possible are kept as mesh-based as the number of the MCU conferences increases as to not exceed a finite capacity of the MCU. The first endpoint may be configured to switch from transmitting a first video data stream and a first audio data stream and receiving a second video data stream and a second audio data stream to transmitting a first combined single video data and audio (video/audio) data stream and receiving a second single mixed video data and audio (video/audio) data stream representing mixed media data from one or more endpoints upon a determination made by an intermediate component associated with the MCU configured to monitor the network capabilities of the first endpoint during mesh-based videoconferencing. In one instance, when switching to MCU-based videoconferencing, the first endpoint is configured to slice up the inbound video data to display it in the same layout as the mesh-based videoconference. The first endpoint may be configured to receive metadata describing the layout of video produced by the MCU. The first endpoint may also be configured with metadata resources describing the format layout of video produced by the MCU, and wherein when an endpoint is not mesh-based videoconferencing capable, the endpoint may be configured to display the videoconference data stream as provided by the MCU.

In another aspect of the present disclosure, a videoconferencing system comprises a first endpoint associated with one or more first videoconference participants and a second endpoint associated with one or more second videoconference participants. The first and second endpoints are configured to transmit and receive respective first and second video data streams and respective first and second audio data streams. Upon the occurrence of a trigger event, the first endpoint and the second endpoint are configured to respectively transmit a first single combined video/audio data stream and a second single combined video/audio data stream to an MCU and respectively receive a first mixed single video/audio data stream and a second mixed single video/audio stream from the MCU.

According to the above, the trigger event may comprise at least one or both of a service event and a network capability of at least one participant of the videoconference. The service event may comprise exceeding a fixed number of participants for a videoconference service. The network capability may comprise exceeding the network capabilities of the first endpoint or the second endpoint. The network capability may comprise exceeding the network capabilities of the first endpoint or the second endpoint with or without adaptive bit rate control. The network capability may also comprise exceeding the network capabilities of a proportion of endpoint that have had video data reduced or suppressed. The threshold for the trigger event may be dynamically variable based on the current load on the MCU. The threshold for the trigger event may also increase dynamically based on the number of MCU conferences and participants in use so that as many conferences as possible are kept as mesh-based as the number of the MCU conferences increases as to not exceed a finite capacity of the MCU. The first endpoint may be configured to switch from transmitting a first video data stream and a first audio data stream and receiving a second video data stream and a second audio data stream to transmitting a first single video data and audio data stream and receiving a second single video data and audio data stream upon a determination made by an intermediate component associated with the MCU configured to monitor the network capabilities of the first endpoint during mesh-based videoconferencing. The videoconferencing system may further comprise an MCU, wherein, wherein the MCU is configured to stream the same view to every participant. The MCU may be configured to stream a tailored view to each participant. The tailored view comprises removing the video of the participant from the video received by the participant.

In yet another aspect of the present disclosure, a videoconferencing system comprising an intermediate component that includes a media forking module configured to act as an intelligent switch based on network capacity of an endpoint comprising forking a single videoconference video and audio data stream, which may also be referred to as a combined video/audio data stream, into separate video and audio data streams.

An MCU may be a central resource that may limit the number of conferences or participants that can be held or joined concurrently to the capacity of the deployed MCUs. Video processing is typically resource intensive and excess processing capacity may be quickly occupied by large videoconferences. Capacity is generally available through expensive dedicated hardware setups or significant quantity of commodity servers to scale to large numbers of conferences or participants. In various embodiments, an MCU comprises or is configured to operatively associate with a central resource configured to manage conferences. For example, the central resource may comprise an intermediate component or controller configured to function as a conference manager, e.g., providing access controls for participants joining conference, notifying participants of other participants joining and leaving the conference, etc. It will generally be preferable that the conference manager or controller only be involved in the signaling and not the media processing and thus will generally be far more scalable than the MCU by several orders of magnitude.

As described above, mesh-based conferencing places a requirement on endpoints to be able to stream videoconference data such as video and audio data to and from each of the other participant endpoints in the conference. However, when endpoints lack compatibilities with MCUs or with mesh-based operations, switching endpoints or videoconferences between different videoconference bases may be problematic. For example, endpoints designed to work with traditional MCUs may lack mesh-based based capabilities such as the ability to stream multiple videoconference streams to each endpoint.

In various embodiments, a videoconferencing system, method, and associated devices thereof comprise combining meshed and non-meshed devices to optimise network resources and removing the need for central MCU resources when they are not required.

In one embodiment, endpoints lacking a desired mesh-based capability may utilize an MCU to participate in a mesh-based conference. For brevity, such endpoints may be referred herein as non-mesh endpoints. However, it is contemplated that endpoints that are fully capable or have limited capabilities for mesh-based operations may find favourable operation as a non-mesh endpoint. Thus, reference to non-mesh endpoints herein may include endpoints capable of mesh-based operation as well as those that are not. In some embodiments, endpoints may be configured to provide a signal before or during joining or creating a videoconference that the endpoint is to be treated by the conference as a non-mesh endpoint, irrespective of capabilities otherwise. For example, a conference manager, which may also be referred to as a controller, signal processor, or module, and which may include a gateway, switch, or any of the various functionalities described herein with respect to intermediate components.

In one embodiment, a method of enabling combined meshed and non-meshed videoconferencing comprises utilizing an intermediate device comprising a hybrid MCU, which may also be referred to as a hybrid MCU module, configured for use as a mesh proxy. In use, the hybrid MCU may be configured to function as a mesh participant with respect to meshed endpoints. The hybrid MCU may generally include a processing module or mixer and be configured or configurable to receive and mix videoconference data streams. More specifically, the processing module of the MCU may be configured or configurable to mix media streams from one or more endpoint participants of a videoconference, e.g., receive and mix media streams from meshed and non-meshed endpoints and transmit the mixed media to non-mesh endpoints or possibly from non-mesh endpoints. Thus, according to certain embodiments, a hybrid MCU is configured as a hybrid mesh participant as far as the other meshed endpoints are concerned.

In various embodiments, a videoconferencing system and method comprises a hybrid MCU comprising a processing module and comprising or operable associated with a controller. The hybrid MCU may be configured to combine meshed and non-meshed devices in a single meshed videoconference wherein the non-meshed devices participate in the mesh-based conference using the hybrid MCU as a proxy. In certain configurations, the hybrid MCU is configured to optimise network resources and limit or eliminate the need for central MCU resources when they are not required. In one configuration, the hybrid MCU may be used in mesh-based videoconferencing to enable fluid promotion and demotion of conferences between mesh and MCU-based videoconferences, which in some instances may be seamless as described above. In some embodiments, the hybrid MCU is provided as or is associated with an auxiliary service in a promotion and demotion application. Thus, the hybrid MCU functionality may be provided as an add-on or modular service for a wide variety services. In other embodiments, however, the hybrid MCU is provided as a separate service.

Figure 7:
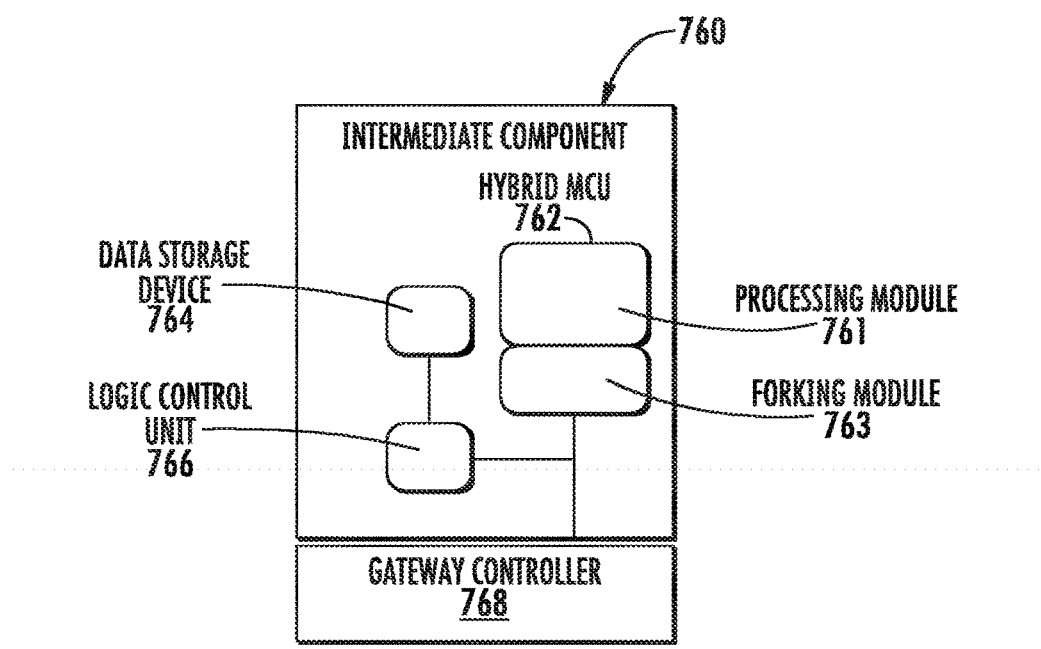
FIG. 7 is a schematic representation of an intermediate component comprising a hybrid MCU module according to various embodiments described herein.

FIG. 7 schematically illustrates an intermediate component 760 comprising one or more servers 770 or gateways. According to various embodiments, the intermediate component 760 may include similar functionalities as described above with respect to intermediate components 350, 460, 560 and may comprise one or more networks as well as centralized or remote devices or functionalities distributed among multiple hardware or software embodiments. The intermediate component 760 comprises a hybrid MCU or hybrid MCU module 762 for use in a videoconferencing system and method as described herein. The hybrid MCU module 762 is configured to combine meshed and non-meshed devices in a single meshed videoconference wherein the non-meshed devices participate in the mesh-based conference using the hybrid MCU module 762 as a proxy. In certain configurations, the hybrid MCU module 762 is configured to optimise network resources and limit or eliminate the need for central MCU resources when they are not required. The hybrid MCU module 762 comprises a processing module 761 configured to process or mix videoconferencing data streams comprising media data streams. The hybrid MCU module 762 further comprises a forking module 763. The forking module 763 is configured to fork a single or combined video/audio data stream comprising multiple media data such as a combined video/audio data stream into separate media streams such as a separate audio data stream and a video data stream. The hybrid MCU module 762 is further configured to provide a single mixed videoconference data stream to each non-mesh endpoint. In some embodiments, the hybrid MCU module 762 is configured to remove the participants videoconference data from the stream. In one embodiment, a non-mesh endpoint is configured to remove its videoconference data from the single mixed video and audio data stream.

The intermediate component 760 also includes a data storage device 764 for storing instructions, e.g., a program, for performing the hybrid MCU module 762 functionalities. The intermediate component 760 further includes a logic control unit 766, such as an electronic processor, configured to execute instructions stored by the data storage device. In the particular embodiment shown in FIG. 7, the intermediate component 760 further comprises a gateway controller 768. It is to be appreciated that in certain embodiments the hybrid MCU module 762 may comprise the data storage 764 module or described functionalities, the logic control unit 766 or described functionalities, or the gateway controller 768 and described functionalities. In various embodiments, the gateway controller 768 comprises similar capabilities and functionalities as described above with respect to gateway controller 568. Briefly, in some embodiments, the gateway controller 768 is configured to operate as a videoconference manager. In other embodiments, the hybrid MCU module 762 may comprise or be operatively associated with another controller. In either case, the various controllers associated with the system may be configured to cooperate to perform the herein described operations.

Figure 8:
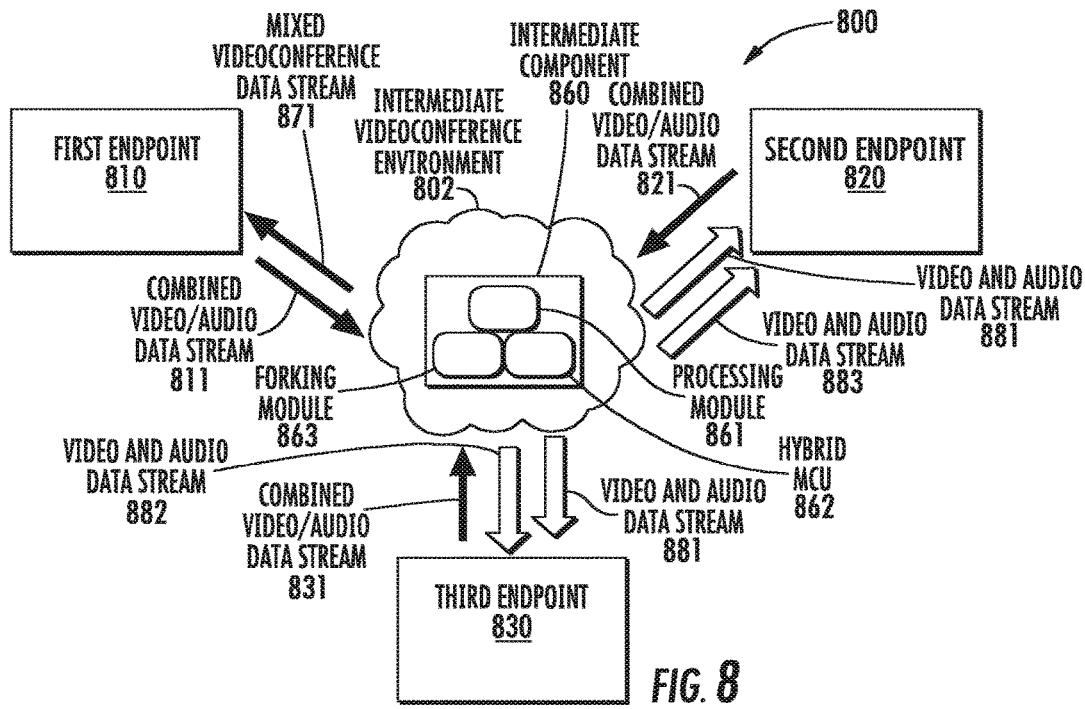
FIG. 8 is a schematic representation of a videoconference system comprising a hybrid MCU module according to various embodiments described herein.

Referring to FIG. 8, in one embodiment a videoconference system 800 and method for enabling non-meshed endpoints 810 to participate in a meshed-based videoconference comprises transmitting videoconference data between or through an intermediate videoconference environment 802 between two or more endpoints 810, 820, 830. While only three endpoints 810, 820, 830 are shown, it is to be understood that additional or fewer endpoints 810, 820, 830 could be added or dropped. Furthermore, the endpoints 810, 820, 830 may be associated with one or more participants and associated client devices. The first endpoint 810 comprises a non-mesh endpoint. The second endpoint 820 and the third endpoint 830 comprise mesh endpoints.

The system 800 includes an intermediate component 860 comprising a hybrid MCU module 862, which may also be referred to as a hybrid MCU, for use in the videoconferencing system 800 and method. The intermediate component may be similar to or include similar processing and gateway functions as described above with respect to intermediate component 760. The system 800 is configured to combine meshed 820, 830 and non-meshed 810 devices in a single meshed videoconference wherein the non-meshed devices 810 participate in the mesh-based conference using the hybrid MCU module 862 as a mesh proxy. In certain configurations, the hybrid MCU module 862 is configured to optimise network resources and limit or eliminate the need for central MCU resources when they are not required. The hybrid MCU module 862 further comprises a processing module 861 configured to process or mix videoconferencing data streams comprising media data streams 881, 883.

The hybrid MCU module 862 is further configured to provide a single mixed videoconference data stream 871 to each non-mesh endpoint 810. In some embodiments, the hybrid MCU module 862 is configured to remove all or a portion of the receiving participant's videoconference data from the stream 871. In one embodiment, a non-mesh endpoint 810 is configured to remove its videoconference data from the mixed video/audio data stream 871, however, other situational variations are contemplated. For example, according to one configuration applied to the situation shown in FIG. 8, for example, the processing module 861 may mix at least the combined video/audio streams 821, 831 received from the respective second and third endpoints 820, 830 for transmission to the first endpoint 810. While in most instances the processing module 861 mixes all data streams 811, 821, 831, in this situation, because there is only a single non-mesh endpoint 810 to which a single mixed media stream 871 is to be transmitted, the hybrid MCU 862 could be configured to initially forgo mixing the video and audio data in the combined video/audio data stream 811 transmitted by the first endpoint 810 until an additional non-mesh endpoint joins the conference. Thus, when there are multiple non-mesh endpoints 810, all such combined video/audio data streams may be mixed by the processing module 861.

The hybrid MCU module 862 further comprises a forking module 863. The forking module 863 is configured to fork a single or combined video/audio data stream 811, 821, 831 comprising multiple media data, e.g., a combined video/audio data stream, into separate media streams, e.g., a video data stream and an audio data stream. For example, the forking module 861 may fork the combined video/audio data stream 811 transmitted from the non-mesh first endpoint 810 to provide a separate video data and audio data stream 881 to each of the mesh endpoints 820, 830. The forking module may be further fork the combined video/audio data streams 821, 831 transmitted from each of the mesh endpoints 820, 830 to provide separate video and audio data streams 882, 883 to each of the mesh endpoints 820, 830.

In certain configurations, the hybrid MCU 862 is configured to receive and mix the videoconference media data 811, 821, 831 or a media portion thereof from all participants 810, 820, 830. The hybrid MCU 862 is further configured to transmit or provide a single mixed or otherwise mixed video/audio data stream 871 including the media data received in combined video/audio data streams 811, 821, 831 mixed to each non-mesh endpoint 810, which in some embodiments may have the receiving participant's combined video/audio data or video and audio data removed. While certain data streams may be generally referred to herein as being the same or similar or identified by similar numbers, it will be appreciated that the same or similar data sent to different endpoints may be modified, e.g., formatted for purposes of transmission or presentation, without departing from this disclosure. Such modified data, however, may still retain the described character of being separate, mixed, or combined, for example, and being representative of the media data communications of the endpoint participant. For example, in one embodiment, the hybrid MCU 862 is further configured to provide the data stream 871 to the non-mesh endpoints 810 such that the layout may display or present the other participants or media data in a manner that is the same, comparable, or that simulates the layout used by meshed endpoints 820, 830. In various embodiments, the non-mesh endpoints 810 may be configured to slice up the inbound video data portion of data stream 871 to display in the same layout as the mesh-endpoints 820, 830. The hybrid MCU 862 may be configured to include various layouts for display that may be mapped by the mesh endpoints 810 to the layout used by the mesh endpoints 820, 830. In various embodiments, the intermediate component 860 or hybrid MCU 862 may comprise a signaling element configured to include metadata in a data stream sent to non-mesh endpoints wherein the metadata describes the layout of the video used by the mesh endpoints 820, 830. Depending on the hybrid MCU 862 configuration, the hybrid MCU 862 may stream the same view to every non-mesh participant or may stream a tailored view to correspond or simulate the view of the mesh participants.

As shown in FIG. 8, mesh endpoints 820, 830 may be configured to switch between transmitting separate audio data streams and video data streams to each mesh endpoint 820, 830 to transmitting a combined video/audio data stream 821, 831 to the hybrid MCU 861. In some instances, the mesh endpoints 820, 830 may be configured to transmit a combined video/audio data stream to the hybrid MCU module 862 and receive a mixed video/audio data stream from the hybrid MCU module 862 and thus operate is a traditional MCU-based operation. In another variation, mesh endpoints 820, 830 may select or be requested to transmit separate audio data streams and video data streams to one or more mesh endpoints and transmit a combined video/audio data stream to the hybrid MCU module 862. In a further variation, one or more mesh endpoints 820, 830 may include MCU functionality and may collect and mix data streams from one or more mesh endpoints 820, 830 to provide a mixed video/audio data stream to the hybrid MCU 862 for further mixing with data streams from other endpoints 810.

Figure 9:
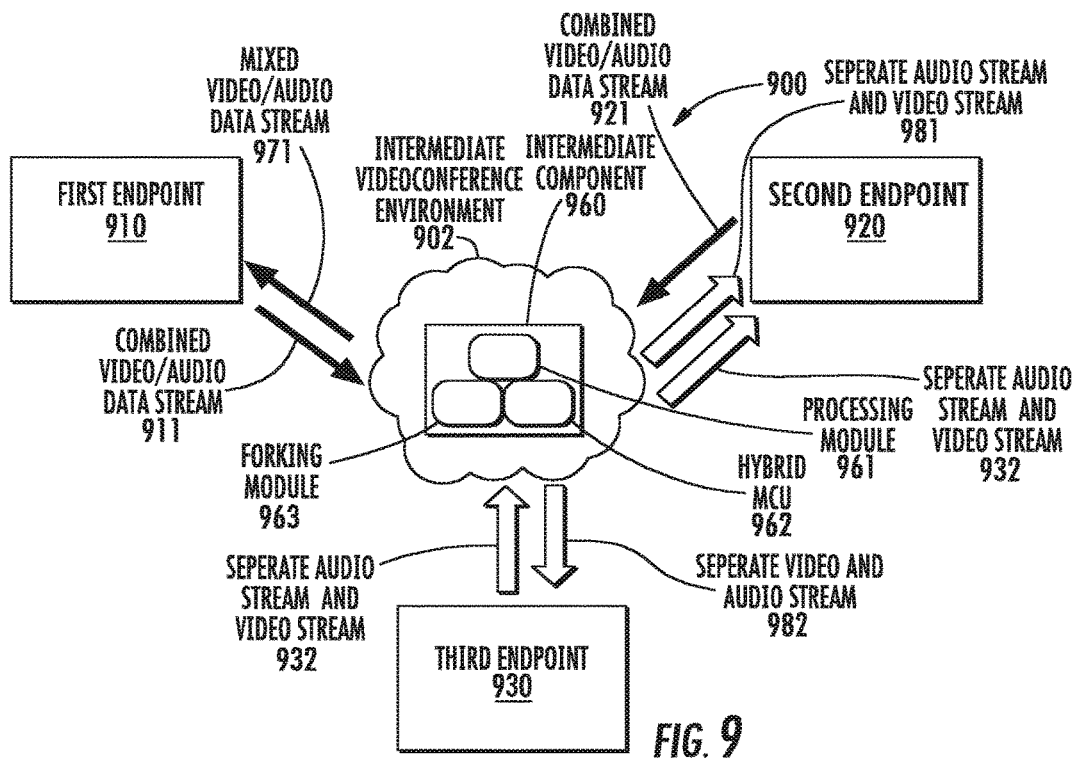
FIG. 9 is a schematic representation of a videoconference system comprising a hybrid MCU module according to various embodiments described herein.

FIG. 9 illustrates another configuration of a videoconference system 900 and method for enabling non-meshed endpoints 910 to participate in a meshed-based videoconference comprises transmitting videoconference data through an intermediate videoconference environment 902 between two or more endpoints. While only three endpoints 910, 920, 930 are shown, it is to be understood that additional or fewer endpoints 910, 920, 930 could be added or dropped, as the case may be. Furthermore, the endpoints 910, 920, 930 may be associated with one or more participants and associated client devices, however, for brevity, such details are not illustrated. The participant endpoints 910, 920, 930 and the general configuration of components is similar to that described above with respect to FIG. 8 and, therefore, descriptions of similar features may not be described again in detail. In this configuration, the processor module 961 is configured to handle and mix separate data streams, e.g., if a mesh endpoint 920, 930 is unable to switch to transmission of a single or combined video/audio data stream. As shown, the first endpoint 910 transmits a single or combined video/audio data stream 911 to the intermediate component 960. The processing module 961 of the hybrid MCU 962 is configured to mix the data stream 911 and the forking module 963 is configured to fork the data stream 911 into separate video and audio data streams 981 for transmission to each mesh endpoint 920, 930. The second endpoint 920 is configured to transmit a single or combined video/audio data stream 921 to the intermediate component 960. The processing module 961 of the hybrid MCU 962 is configured to mix the data stream 921 with data stream 911 and the forking module 961 is configured to fork the data stream 921 into separate video and audio data streams 982 for transmission to the third endpoint 930. The third endpoint 930 may be unable to or otherwise may not transmit a single or combined video/audio data stream to the intermediate component 960, therefore, the third endpoint 930 may transmit a separate audio stream and a video stream 932 to the intermediate component 960. The processing module 961 of the hybrid MCU 962 is configured to mix the media data of data stream 932 with that of data streams 911, 921 from the first and second endpoints 910, 920 into a mixed single video/audio data stream for transmission to non-mesh endpoints 910. In this case, because the forking may not be needed to provide a mesh compatible data stream 932 to the second endpoint 920, the intermediate component 960 may be configured to route or pass the data stream 932 to the second endpoint 920.

It is to be appreciated that the various embodiments described here may be used with any suitable signaling protocol to control how participants join conferences and interact with other participants. Among suitable protocols are WebRTC, SIP & H.323.

It is to be further appreciated that in addition to mesh videoconferencing or full mesh videoconferencing where each participant or endpoint sends videoconference data streams to all other participants or endpoints the principles and approach described here are equally applicable to peer-to-peer networking strategies including small-world networks. In various embodiments, an MCU service comprising an MCU may allow for streaming video from the current active speaker or nominated speaker. While the intent with mesh conferences is to show video from multiple sources the approaches outlined in this proposal can be effectively applied to active speaker or one or more nominated speaker display schemes.

The foregoing description of the various exemplary embodiments is provided to enable any person skilled in the art to make and use the present invention and its embodiments. Various modifications to these embodiments are possible, and the generic principles presented herein may be applied to other embodiments as well.

In various embodiments, the herein described systems and methods may be implemented in software, firmware, or executable instructions stored in a data storage medium such as or including machine-readable medium. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. Some embodiments may be implemented using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. Computers and computer systems described herein may include operatively associated computer-readable memory media such as memory for storing software applications and instructions used in obtaining, processing, storing or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), or other like computer-readable media. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like.

It will be further apparent to one of ordinary skill in the art that some of the embodiments as described hereinabove may be implemented in many different embodiments of instruction (e.g., software or firmware) and hardware. The instructions may include any suitable type of code, such as source code, compiled code, interpreted code, executable code, static code, dynamic code, and the like. The actual software code or specialized control hardware used to implement some of the illustrated embodiments do not limit the present invention. The instructions may be implemented, for example, using any suitable programming language, which may include high-level, low-level, object-oriented, visual, compiled or interpreted programming languages, such as, but not limited to, C, C++, Java, BASIC, SQL, Perl, Matlab, Pascal, Visual BASIC, assembly language, machine code, and so forth. The embodiments are not limited in this context.

The invention claimed is:

1. A videoconferencing device configured to act as a hybrid mesh participant in a videoconference environment, the videoconferencing device comprising:
a hybrid MCU configured to receive and transmit data streams comprising videoconference video media data and audio media data in a videoconference, the hybrid MCU comprising
a processing module configured to mix at least a portion of the video media data and the audio media data received by the hybrid MCU, and wherein the hybrid MCU is configured to transmit the mixed video media data and the mixed audio media data to each non-mesh endpoint in a mixed video/audio data stream; and
a forking module configured to fork combined video/audio data streams received by the hybrid MCU into separate video and audio data streams, and wherein the hybrid MCU is configured to transmit the separate video and audio data streams to each mesh endpoint, wherein the hybrid MCU is configured to act as a proxy for non-mesh endpoints and be viewed as a mesh participant by mesh endpoints.

2. The videoconferencing device of claim 1, wherein the hybrid MCU is configured to receive the combined video/audio data streams from at least the mesh endpoints.

3. The videoconferencing device of claim 1, wherein when both the mesh and non-mesh endpoints transmit the combined video/audio data streams to the hybrid MCU, the forking module is configured to fork each combined video/audio data stream received to provide each mesh endpoint a separate video and audio data stream for each combined video/audio data stream received from the non-mesh endpoints and the other mesh endpoints of the videoconference.

4. The videoconferencing device of claim 1, wherein the hybrid MCU is configured to enable non-mesh capable endpoints to participate in a mesh videoconference.

5. The videoconferencing device of claim 1, wherein the hybrid MCU is further configured to provide each of the non-mesh endpoints the mixed video/audio data stream in a format such that the video media data and the audio media data of the mixed video/audio data stream may be presented at the non-mesh endpoint using a layout comparable to a layout used at the mesh endpoints.

6. The videoconferencing device of claim 1, wherein the processing module is configured to mix the video media data and the audio media data received from all the mesh and non-mesh endpoints of the videoconference.

7. A method of combining meshed and non-meshed devices in a single videoconference comprising:
receiving data streams comprising video media data and audio media data from videoconference participants comprising mesh endpoints and non-mesh endpoints;
mixing at least a portion of the video media data and the audio media data received with a hybrid MCU;
providing a mixed video/audio data stream to each non-mesh endpoint; and
providing separate video and audio data streams from each non-mesh endpoint to each mesh endpoint, wherein providing separate video and audio data streams from each non-mesh endpoint to each mesh endpoint comprises forking combined video/audio data streams received into the separate video and audio data streams, wherein the hybrid MCU acts as a proxy for non-mesh endpoints and is viewed as a mesh participant by mesh endpoints.

8. The method of claim 7, further comprising signalling with the hybrid MCU to the mesh endpoints to transmit the combined video/audio data streams.

9. The method of claim 7, wherein, when both the mesh and non-mesh endpoints transmit combined video/audio data streams to the hybrid MCU, forking further comprises forking the combined video/audio data stream received from the mesh endpoints to provide each mesh endpoint a separate video and audio data stream comprising video media data and audio media data of each of the other mesh endpoints of the videoconference.

10. The method of claim 7, wherein the hybrid MCU is configured to enable non-mesh capable endpoints to participate in the mesh videoconference.

11. The method of claim 7, further comprising transmitting with the hybrid MCU the mixed video/audio data stream to each non-mesh endpoint in a format such that the video media data and the audio media data of the mixed video/audio data stream may be presented at the non-mesh endpoint using a layout comparable to a layout used at the mesh endpoints.

12. The method of claim of claim 7, further comprising mixing all the video media data and audio media data received from all the mesh and non-mesh endpoints of the videoconference.

13. The method of claim 7, further comprising optimizing network resources and removing the need for central MCU resources when the resources are not required.

14. A videoconferencing system comprising:
a hybrid MCU configured to act as a hybrid mesh participant in a videoconference, wherein the hybrid MCU comprises:
a processing module to mix videoconference media data comprising video data and audio data received in data streams from mesh and non-mesh endpoints of the videoconference; and
a forking module to fork combined video/audio data streams from mesh and non-mesh endpoints to provide separate video and audio data streams to each mesh endpoint;
wherein the hybrid MCU is configured to provide a mixed video/audio data steam to each non-mesh endpoint of the videoconference, and wherein the hybrid MCU is configured to act as a proxy for non-mesh endpoints and be viewed as a mesh participant by mesh endpoints.

15. The videoconferencing system of claim 14, wherein, when both the mesh and non-mesh endpoints transmit the combined video/audio data streams to the hybrid MCU, the forking module is configured to fork the combined video/audio data streams received from the mesh endpoints to provide each mesh endpoint a separate video and audio data stream comprising video media data and audio media data of each of the other mesh endpoints of the videoconference.

16. The videoconferencing system of claim 14, wherein the hybrid MCU is configured to enable non-mesh capable endpoints to participate in a mesh videoconference.

17. The videoconferencing system of claim 14, wherein the hybrid MCU is further configured to provide each non-mesh endpoint the mixed video/audio data stream in a format such that the video media data and the audio media data of the mixed video/audio data stream may be presented at the non-mesh endpoint using a layout comparable to a layout used at the mesh endpoints.

18. The videoconferencing system of claim 14, wherein the processing module is configured to mix the video media data and the audio media data received from all the mesh and non-mesh endpoints.

* * * * *